US012608640B2

(12) United States Patent
Feldman et al.

(10) Patent No.: US 12,608,640 B2
(45) Date of Patent: Apr. 21, 2026

(54) USING CONTAINER AND MODEL INFORMATION TO SELECT CONTAINERS FOR EXECUTING MODELS

(71) Applicant: Salesforce, Inc., San Francisco, CA (US)

(72) Inventors: Yuliya L. Feldman, Campbell, CA (US); Seyedshahin Ashrafzadeh, Foster City, CA (US); Alexandr Nikitin, El Sobrante, CA (US); Manoj Agarwal, Cupertino, CA (US)

(73) Assignee: Salesforce, Inc., San Francisco, CA (US)

( * ) Notice: Subject to any disclaimer, the term of this patent is extended or adjusted under 35 U.S.C. 154(b) by 831 days.

(21) Appl. No.: 17/159,805

(22) Filed: Jan. 27, 2021

(65) Prior Publication Data

US 2022/0237506 A1     Jul. 28, 2022

(51) Int. Cl.
*G06N 3/0455*     (2023.01)
*G06F 9/455*     (2018.01)
*G06F 9/50*     (2006.01)
*G06N 20/00*     (2019.01)
*G06F 8/71*     (2018.01)

(52) U.S. Cl.
CPC ......... *G06N 20/00* (2019.01); *G06F 9/45558* (2013.01); *G06F 9/5077* (2013.01); *G06F 8/71* (2013.01); *G06F 2209/501* (2013.01)

(58) Field of Classification Search
CPC ... G06N 20/00; G06F 9/45558; G06F 9/5077; G06F 16/23; G06F 2209/501; G06F 2009/45562; G06F 2009/4557; G06F 2009/45575
See application file for complete search history.

(56) References Cited

U.S. PATENT DOCUMENTS 5,577,188 A     11/1996 Zhu
5,608,872 A     3/1997 Schwartz
(Continued)

OTHER PUBLICATIONS

Office Action (Non-Final Rejection) dated Mar. 12, 2024 for U.S. Appl. No. 17/159,639 (pp. 1-21).

(Continued)

*Primary Examiner* — Nicholas P Celani
*Assistant Examiner* — Wuji Chen
(74) *Attorney, Agent, or Firm* — Kwan & Olynick LLP

(57)     ABSTRACT

Using container and model information to select containers for executing models is described. A system receives a request from an application and identifies a version of a machine-learning model associated with the request. The system identifies model information associated with machine learning models corresponding to a cluster of available serving containers associated with the version of the machine-learning model. The system uses the model information to select a serving container from the cluster of available serving containers. If the machine-learning model is not loaded in the serving container, the system loads the machine-learning model in the serving container. If the machine-learning model is loaded in the serving container, the system executes, in the serving container, the machine-learning model on behalf of the request. The system responds to the request based on executing the machine-learning model on behalf of the request.

20 Claims, 9 Drawing Sheets

(56) References Cited

U.S. PATENT DOCUMENTS

| | | | |
|---|---|---|---|
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,730,478 B2 | 6/2010 | Weissman | |
| 7,779,039 B2 | 8/2010 | Weissman et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,926,131 B1 * | 3/2018 | Lehmann | G06Q 10/083 |
| 10,509,648 B2 * | 12/2019 | Rabin | G06F 8/77 |
| 10,621,019 B1 * | 4/2020 | Faulhaber, Jr. | G06N 5/04 |
| 10,785,334 B2 * | 9/2020 | Kristiansson | G06F 16/2255 |
| 10,812,366 B1 * | 10/2020 | Berenberg | H04L 67/1014 |
| 10,931,786 B1 * | 2/2021 | Vasquez | H04L 41/0893 |
| 11,055,273 B1 * | 7/2021 | Meduri | G06F 16/2358 |
| 11,151,467 B1 * | 10/2021 | Shtein | G06N 7/00 |
| 11,200,204 B2 * | 12/2021 | Wang | G06F 16/128 |
| 11,272,164 B1 * | 3/2022 | Xing | G06F 9/445 |
| 11,341,605 B1 * | 5/2022 | Singh | H04L 67/1095 |
| 11,429,893 B1 * | 8/2022 | Tong | G06N 20/00 |
| 11,487,942 B1 * | 11/2022 | Senthivel | G06N 3/0442 |
| 11,537,439 B1 * | 12/2022 | Liberty | G06F 9/5077 |
| 11,550,614 B2 * | 1/2023 | Faulhaber, Jr. | G06F 9/45558 |
| 11,652,769 B2 * | 5/2023 | Weiss | H04L 51/214 |
| | | | 709/206 |
| 11,775,867 B1 * | 10/2023 | Jamei | H04L 63/10 |
| | | | 706/12 |
| 11,853,401 B1 * | 12/2023 | Nookula | G06F 18/2163 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2012/0208501 A1 * | 8/2012 | Tsuda | H04M 1/72403 |
| | | | 455/411 |
| 2012/0233137 A1 | 9/2012 | Jakobson et al. | |

(56) References Cited

U.S. PATENT DOCUMENTS

| | | | | |
|---|---|---|---|---|
| 2013/0047203 A1* | 2/2013 | Radhakrishnan | ..... | G06F 21/577 726/1 |
| 2013/0218948 A1 | 8/2013 | Jakobson | | |
| 2013/0218949 A1 | 8/2013 | Jakobson | | |
| 2013/0218966 A1 | 8/2013 | Jakobson | | |
| 2013/0247519 A1* | 9/2013 | Clark | ..................... | B65B 57/00 53/452 |
| 2013/0330020 A1* | 12/2013 | Thakkar | ............. | G06F 16/2291 382/305 |
| 2014/0082131 A1* | 3/2014 | Jagtap | .................. | G06F 9/5027 709/217 |
| 2014/0359537 A1 | 12/2014 | Jakobson et al. | | |
| 2015/0007050 A1 | 1/2015 | Jakobson et al. | | |
| 2015/0095162 A1 | 4/2015 | Jakobson et al. | | |
| 2015/0172563 A1 | 6/2015 | Jakobson et al. | | |
| 2015/0379429 A1* | 12/2015 | Lee | .......................... | G09B 5/00 706/11 |
| 2015/0379430 A1* | 12/2015 | Dirac | ..................... | G06N 20/00 706/12 |
| 2016/0078361 A1* | 3/2016 | Brueckner | ............. | H04L 67/10 706/12 |
| 2016/0269318 A1* | 9/2016 | Su | ......................... | H04L 47/785 |
| 2016/0330277 A1* | 11/2016 | Jain | ..................... | H04L 67/1095 |
| 2017/0063722 A1* | 3/2017 | Cropper | ............... | G06F 16/285 |
| 2017/0344910 A1* | 11/2017 | Wu | ........................ | G06N 20/00 |
| 2018/0089592 A1* | 3/2018 | Zeiler | .................... | G06N 3/045 |
| 2018/0152534 A1* | 5/2018 | Kristiansson | ........... | H04L 67/56 |
| 2018/0176070 A1* | 6/2018 | Shafiee | ................. | G06F 9/5083 |
| 2018/0219959 A1* | 8/2018 | Bugenhagen | ........... | H04L 67/51 |
| 2018/0278680 A1* | 9/2018 | Liu | .................... | H04L 67/1031 |
| 2018/0349191 A1* | 12/2018 | Dorsey | ................ | G06F 9/5044 |
| 2018/0357047 A1* | 12/2018 | Brown | ................ | G06F 18/2148 |
| 2019/0102206 A1 | 4/2019 | Fichtenholtz | | |
| 2019/0155633 A1* | 5/2019 | Faulhaber, Jr. | ......... | G06N 5/04 |
| 2019/0156244 A1* | 5/2019 | Faulhaber, Jr. | ........ | G06N 20/00 |
| 2019/0156247 A1* | 5/2019 | Faulhaber, Jr. | ........ | G06N 3/045 |
| 2019/0279114 A1* | 9/2019 | Deshpande | ............ | G06N 20/00 |
| 2019/0327259 A1* | 10/2019 | DeFelice | ............... | G06N 3/044 |
| 2020/0167202 A1* | 5/2020 | Huang | .............. | G05B 13/0265 |
| 2020/0272920 A1* | 8/2020 | Liu | ........................ | G06N 5/043 |
| 2020/0311617 A1* | 10/2020 | Swan | .................. | G06F 9/45558 |
| 2020/0322263 A1* | 10/2020 | Wu | ....................... | H04L 47/828 |
| 2021/0026703 A1* | 1/2021 | Fichtenholtz | ......... | G06F 9/5027 |
| 2021/0055977 A1* | 2/2021 | Lisuk | .................... | H04L 67/133 |
| 2021/0073736 A1* | 3/2021 | Alawi | ............. | G06Q 10/06315 |
| 2021/0081313 A1* | 3/2021 | Jang | .................... | G06F 12/0246 |
| 2021/0144517 A1* | 5/2021 | Guim Bernat | ........ | G06F 9/5072 |
| 2021/0150411 A1* | 5/2021 | Coenders | ................ | G06F 21/53 |
| 2021/0174238 A1* | 6/2021 | Song | ................ | G06F 16/24542 |
| 2021/0319360 A1* | 10/2021 | Vishnoi | .................. | G06N 5/043 |
| 2021/0342193 A1* | 11/2021 | Anand | .................. | G06F 9/5077 |
| 2022/0075610 A1* | 3/2022 | Wang | ..................... | H04L 41/08 |
| 2022/0083363 A1* | 3/2022 | Lewis | ..................... | H04L 67/34 |
| 2022/0083389 A1* | 3/2022 | Poothia | ................ | G06F 9/5027 |
| 2022/0172100 A1* | 6/2022 | Balasubramanian | ........................ | G06T 7/0008 |
| 2022/0179661 A1* | 6/2022 | Kim | ......................... | G06N 7/01 |
| 2022/0237505 A1* | 7/2022 | Feldman | ............. | G06F 9/45558 |
| 2022/0237506 A1* | 7/2022 | Feldman | ............. | G06F 9/45558 |
| 2022/0246303 A1* | 8/2022 | Sakaguchi | .............. | G06F 13/00 |
| 2022/0255731 A1 | 8/2022 | Modica | | |
| 2022/0261270 A1* | 8/2022 | Gizis | .................. | G06F 9/45558 |
| 2022/0300754 A1* | 9/2022 | Biswas | .................. | G06N 3/082 |
| 2022/0318647 A1* | 10/2022 | Ashrafzadeh | ........... | G06N 5/04 |
| 2022/0382539 A1* | 12/2022 | Gumashta | .............. | G06N 20/00 |
| 2022/0382601 A1* | 12/2022 | Feldman | ............... | G06N 20/00 |
| 2022/0383150 A1* | 12/2022 | Le | .......................... | G06N 20/00 |
| 2022/0391747 A1* | 12/2022 | Ashrafzadeh | .......... | G06N 20/00 |
| 2022/0391748 A1* | 12/2022 | Nikitin | .................. | H04L 67/133 |
| 2022/0391749 A1* | 12/2022 | Feldman | .............. | G06F 9/5072 |
| 2022/0414547 A1* | 12/2022 | Ashrafzadeh | .......... | G06F 18/29 |
| 2022/0414548 A1* | 12/2022 | Ashrafzadeh | .......... | G06F 18/25 |
| 2023/0059339 A1 | 2/2023 | Rangarajan | | |
| 2023/0074530 A1* | 3/2023 | Rigamonti | .............. | H04L 45/02 |
| 2023/0093963 A1* | 3/2023 | Kumar | .................... | H04L 41/16 370/252 |
| 2023/0110057 A1* | 4/2023 | Kan | .................. | G06F 16/24578 707/723 |
| 2023/0111775 A1* | 4/2023 | Lee | ......................... | G06N 20/00 706/12 |
| 2023/0222783 A1* | 7/2023 | Bowman | ................ | G06V 20/56 382/104 |
| 2023/0273837 A1* | 8/2023 | Fong | ..................... | G06F 9/5072 718/1 |
| 2023/0300686 A1* | 9/2023 | Pantelidou | ........ | H04W 36/0005 370/331 |
| 2023/0306314 A1* | 9/2023 | Chandrasekaran | .... | G06N 20/20 |
| 2023/0325258 A1* | 10/2023 | Wang | ..................... | H04L 41/16 718/105 |
| 2023/0376167 A1* | 11/2023 | Imam | .................. | G06F 3/04847 |
| 2023/0385692 A1* | 11/2023 | Kang | .................... | G06N 20/00 |
| 2024/0022927 A1* | 1/2024 | Tong | ..................... | H04W 4/40 |
| 2024/0143807 A1 | 5/2024 | Singh | | |
| 2025/0173183 A1* | 5/2025 | Trikande | .............. | G06F 9/5027 |

OTHER PUBLICATIONS

Office Action (Final Rejection) dated Jul. 12, 2024 for U.S. Appl. No. 17/159,639 (pp. 1-33).

Office Action (Non-Final Rejection) dated Oct. 25, 2024 for U.S. Appl. No. 17/159,639 (pp. 1-33).

U.S. Appl. No. 17/159,639, USPTO e-Office Action: CTFR—Final Rejection, Jul. 12, 2024, 33 pages.

Office Action (Final Rejection) dated Apr. 15, 2025 for U.S. Appl. No. 17/159,639 (pp. 1-32).

Office Action (Non-Final Rejection) dated Oct. 16, 2025 for U.S. Appl. No. 17/159,639 (pp. 1-32).

Office Action (Final Rejection) dated Feb. 17, 2026 for U.S. Appl. No. 17/159,639 (pp. 1-33).

* cited by examiner

500

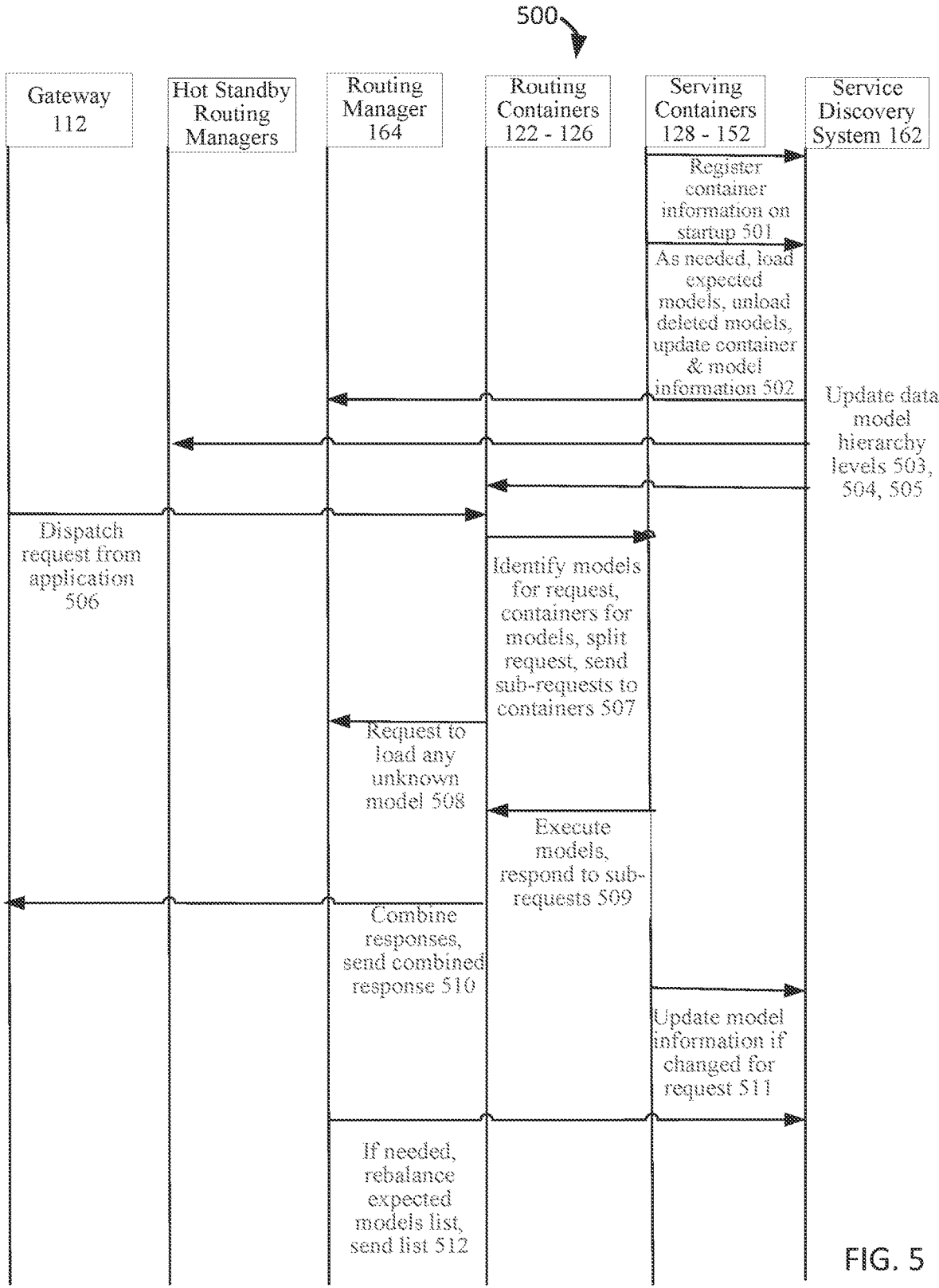

| Gateway 112 | Hot Standby Routing Managers | Routing Manager 164 | Routing Containers 122 - 126 | Serving Containers 128 - 152 | Service Discovery System 162 |

Register container information on startup 501

As needed, load expected models, unload deleted models, update container & model information 502

Update data model hierarchy levels 503, 504, 505

Dispatch request from application 506

Identify models for request, containers for models, split request, send sub-requests to containers 507

Request to load any unknown model 508

Execute models, respond to sub-requests 509

Combine responses, send combined response 510

Update model information if changed for request 511

If needed, rebalance expected models list, send list 512

FIG. 5

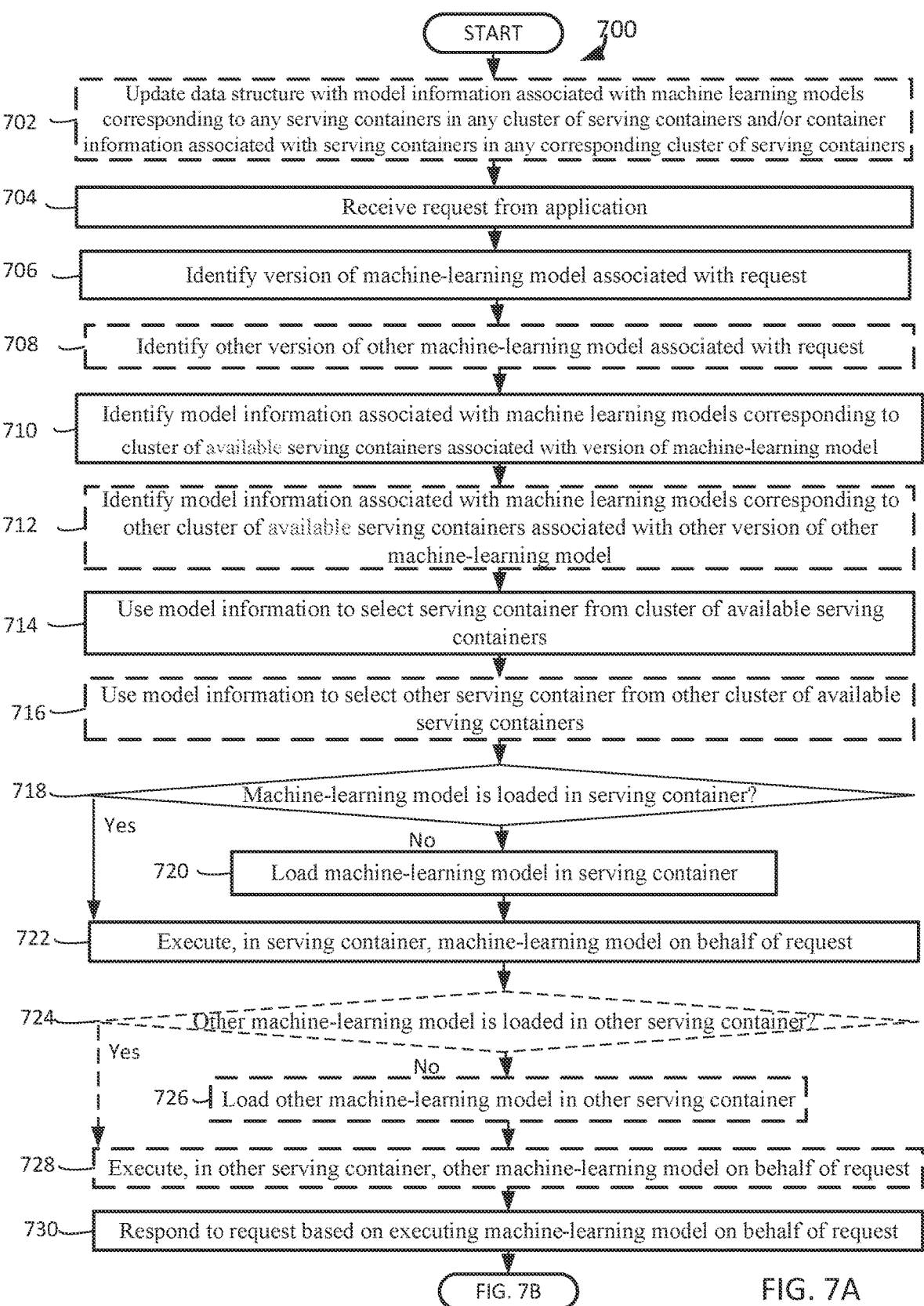

START     700

702 — Update data structure with model information associated with machine learning models corresponding to any serving containers in any cluster of serving containers and/or container information associated with serving containers in any corresponding cluster of serving containers 704 — Receive request from application 706 — Identify version of machine-learning model associated with request 708 — Identify other version of other machine-learning model associated with request 710 — Identify model information associated with machine learning models corresponding to cluster of available serving containers associated with version of machine-learning model 712 — Identify model information associated with machine learning models corresponding to other cluster of available serving containers associated with other version of other machine-learning model 714 — Use model information to select serving container from cluster of available serving containers 716 — Use model information to select other serving container from other cluster of available serving containers 718 — Machine-learning model is loaded in serving container?

Yes

No

720 — Load machine-learning model in serving container

722 — Execute, in serving container, machine-learning model on behalf of request 724 — Other machine-learning model is loaded in other serving container?

Yes

No

726 — Load other machine-learning model in other serving container

728 — Execute, in other serving container, other machine-learning model on behalf of request 730 — Respond to request based on executing machine-learning model on behalf of request

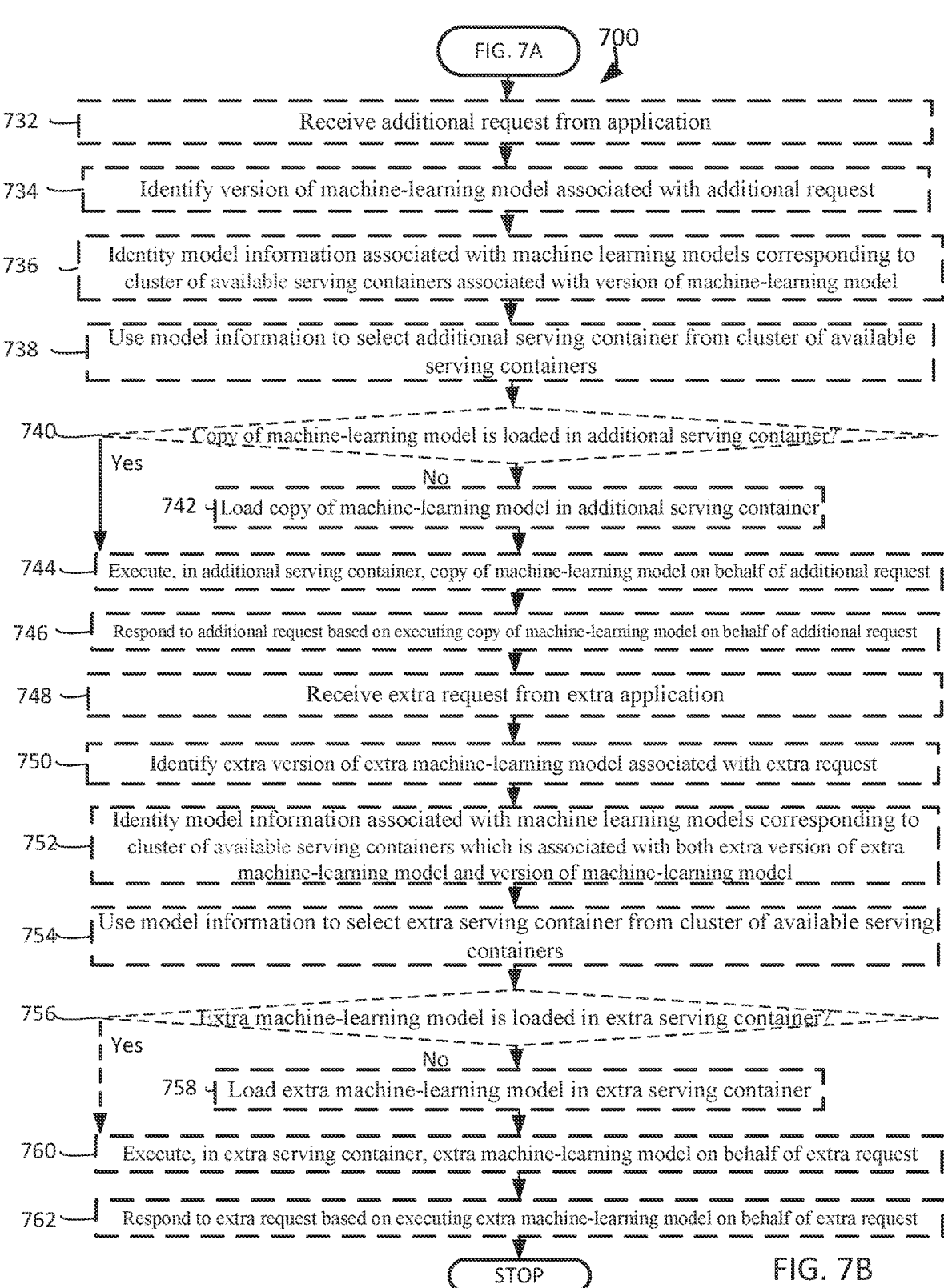

FIG. 7A          700

732 — Receive additional request from application

734 — Identify version of machine-learning model associated with additional request 736 — Identity model information associated with machine learning models corresponding to cluster of available serving containers associated with version of machine-learning model 738 — Use model information to select additional serving container from cluster of available serving containers 740 — Copy of machine-learning model is loaded in additional serving container?

Yes

No

742 — Load copy of machine-learning model in additional serving container

744 — Execute, in additional serving container, copy of machine-learning model on behalf of additional request 746 — Respond to additional request based on executing copy of machine-learning model on behalf of additional request 748 — Receive extra request from extra application 750 — Identify extra version of extra machine-learning model associated with extra request 752 — Identity model information associated with machine learning models corresponding to cluster of available serving containers which is associated with both extra version of extra machine-learning model and version of machine-learning model 754 — Use model information to select extra serving container from cluster of available serving containers 756 — Extra machine-learning model is loaded in extra serving container?

Yes

No

758 — Load extra machine-learning model in extra serving container

760 — Execute, in extra serving container, extra machine-learning model on behalf of extra request 762 — Respond to extra request based on executing extra machine-learning model on behalf of extra request

STOP          FIG. 7B

USING CONTAINER AND MODEL INFORMATION TO SELECT CONTAINERS FOR EXECUTING MODELS

COPYRIGHT NOTICE

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Operating-system-level virtualization, also known as containerization, refers to an operating system feature in which an operating system kernel enables the existence of multiple isolated user-space instances. Each of these instances, also referred to as software containers, partitions, or virtualization engines, can wrap an executing application in a complete environment containing everything that the application needs, such as memory, disk space, network access, and an operating system. Software containers are used by machine-learning serving infrastructures, which are becoming ubiquitous in the emerging machine-learning industry as well as in public cloud computing services. Existing machine-learning serving infrastructures typically provide machine-learning models' services through a one-to-one relationship, by dedicating each individual serving container to hosting only one corresponding machine-learning model and all its required dependencies.

An application can be a computer program or piece of software designed and written to fulfill a particular purpose of a user. A serving container can be an isolated computer program execution environment that is enabled by a computer's operating system, and which executes the main functionality of a machine-learning model. A machine-learning model can be a computer system that scientifically studies algorithms and/or statistical models to perform a specific task effectively by relying on patterns and inference instead of using explicit instructions. A routing container can be an isolated computer program execution environment that is enabled by a computer's operating system, and which executes load-balancing code to direct requests for execution by machine-learning models. A request can be an instruction to a computer to provide information or perform another function.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 5 illustrates an example response to request sequence diagram for using container and model information to select containers for executing models, under an embodiment;

FIGS. 7 A-B depict an operational flow diagram illustrating a high-level overview of a method for using container and model information to select containers for executing models, in an embodiment;

DETAILED DESCRIPTION

General Overview

Figure 1:
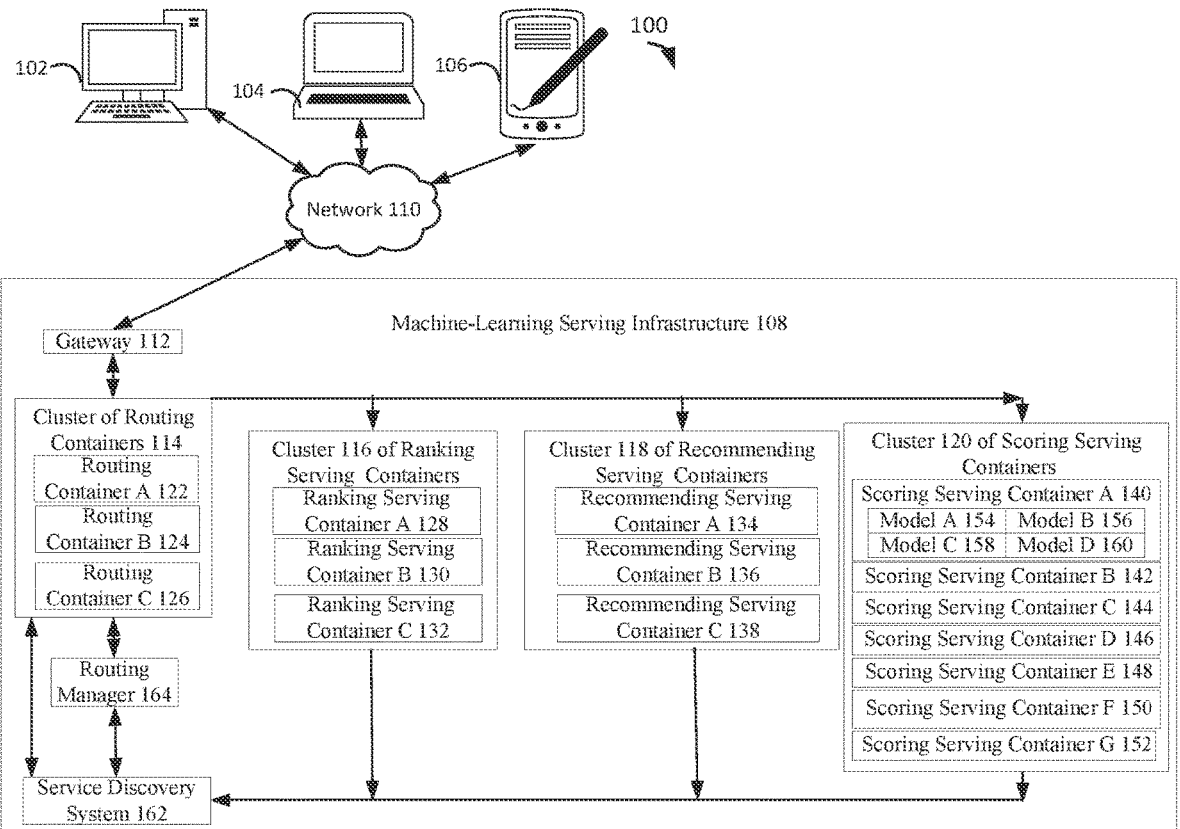
FIG. 1 illustrates a block diagram of an example system for using container and model information to select containers for executing models, under an embodiment.

Automated machine-learning, feature engineering, and training enables a multi-tenancy approach to serving containers hosting machine-learning models, such that a single serving container can host hundreds of machine-learning models for multiple tenants. Within a multitenant architecture, an instance of a software application is designed to provide every tenant with a dedicated share of the instance—including its data, configuration, user management, and tenant individual properties and functionality.

A tenant can be a group of users who share a common access with specific privileges to a software architecture in which a single instance of software serves multiple such groups. A cluster can be a group of similar entities. A cluster of serving containers can be a group of duplicates of an isolated computer program execution environment that is enabled by a computer's operating system, and which executes the main functionality of a machine-learning model for all tenants.

Each routing container, or cluster of routing containers, can authenticate any requesting tenant, and then route any tenant's request for a service by machine-learning models to any serving container in a cluster of serving containers. A machine-learning serving infrastructure can include multiple clusters of serving containers, with each cluster serving a different version of any type of machine-learning model. For example, three clusters of serving containers serve versions 5.7, 5.8, and 5.9 of the type of machine-learning models that generate scores of business opportunities, and one cluster of serving containers serves a new version 1.0 of a different type of machine-learning models that generate recommendations of business opportunities. Each cluster of serving containers can use lazy caching to cache each of its machine-learning models onto all its serving containers. A version can be a form of an entity that differs in certain respects from an earlier form or other forms of the same type of entity.

A cluster of serving containers that can host all machine-learning models of the same version for all tenants is limited by the number of these machine-learning models that a single serving container can hold. Therefore, scaling to accommodate future additions of machine-learning models may become a problem when these machine-learning models exceed the capacity of any individual serving container in the cluster. Since each machine-learning model's size, ranging from hundreds of kilobytes (KB_ to hundreds of megabytes (MB), initialization time, and number of requests can vary widely based on each tenant's underlying database, some clusters of serving containers may be limited by a scarcity of supporting resources, while other clusters of serving containers may have a surplus of supporting resources. The failure or the addition of any container in a cluster of serving containers can create the need to rebalance the supporting resources in the clusters of serving containers. When a machine-learning serving infrastructure adds a new cluster of a serving containers for a new use case, each routing container may need to update software code to route requests to the new cluster of serving containers.

In accordance with embodiments described herein, there are provided methods and systems for using container and model information to select containers for executing models. A system receives a request from an application and identifies a version of a machine-learning model associated with the request. The system identifies model information associated with machine learning models corresponding to a cluster of available serving containers associated with the version of the machine-learning model. The system uses the model information to select a serving container from the cluster of available serving containers. If the machine-learning model is not loaded in the serving container, the system loads the machine-learning model in the serving container. If the machine-learning model is loaded in the serving container, the system executes, in the serving container, the machine-learning model on behalf of the request. The system responds to the request based on executing the machine-learning model on behalf of the request.

For example, a machine-learning serving infrastructure receives a request for scoring a business opportunity from a Customer Relationship Management (CRM) application and identifies the request requires executing a version of an opportunity scoring machine-learning model. A routing container identifies model information about the available cache and available CPU capacity used by the scoring machine learning models in the cluster of scoring serving containers A, B, C, D, E. F, and G. A routing manager applies a multi-dimensional bin-packing algorithm to the model information to select the scoring serving container D which has the largest combination of available cache and available CPU capacity to execute a copy of the specific opportunity scoring machine-learning model, from the cluster of available scoring serving containers A, B, C, D, E. F, and G.

If a copy of the specific opportunity scoring machine-learning model is not already loaded in the scoring serving container D, then the scoring serving container D loads the specific opportunity scoring machine-learning model. When a copy of the specific opportunity scoring machine-learning model is verified to be loaded in the scoring serving container D, the specific opportunity scoring machine-learning model executes the requested service in the scoring serving container D, and the machine-learning serving infrastructure responds to the CRM application's request. Since not every scoring serving container in the cluster of available scoring serving containers A-G will potentially host each machine-learning model, the cluster of available scoring serving containers can scale to host more machine-learning models than any individual scoring serving container can host.

Methods and systems are provided for using container and model information to select containers for executing models. First, systems, sequence diagrams, and hash rings for using container and model information to select containers for executing models will be described with reference to example embodiments. Then methods for using container and model information to select containers for executing models will be described.

Any of the embodiments described herein may be used alone or together with one another in any combination. The one or more implementations encompassed within this specification may also include embodiments that are only partially mentioned or alluded to or are not mentioned or alluded to at all in this summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 depicts an example of a system for using container and model information to select containers for executing models, in an embodiment. As shown in FIG. 1, a system 100 may illustrate a cloud computing environment in which data, applications, services, and other resources are stored and delivered through shared data centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a machine-learning serving infrastructure 108, that may be provided by a hosting company. Although FIG. 1 depicts the first client 102 as a desktop computer 102, the second client 104 as a laptop computer 104, and the third client 106 as a mobile phone 106, each of the clients 102-106 may be any type of computer. The clients 102-106 and the machine-learning serving infrastructure 108 communicate via a network 110.

The machine-learning serving infrastructure 108 includes a gateway 112, and clusters 114-120 of software containers. The cluster 114 of software containers includes software containers 122-126, the cluster 116 of software containers includes software containers 128-132, the cluster 118 of software containers includes software containers 134-138, and the cluster 120 of software containers includes software containers 140-152. The software container 140 includes the machine-learning models 154-160. The machine-learning serving infrastructure 108 also includes a service discovery system 162 and a routing manager 164.

FIG. 1 depicts the system 100 with three clients 102-106, one machine-learning serving infrastructure 108, one network 110, one gateway 112, four clusters 114-120 of software containers, sixteen software containers 122-152, four machine-learning models 154-160, one service discovery system 162, and one routing manager 164. However, the system 100 may include any number of clients 102-106, any number of machine-learning serving infrastructures 108, any number of networks 110, any number of gateways 112, any number of clusters 114-120 of software containers, any number of software containers 122-152, any number of machine-learning models 154-160, any number of service discovery systems 162, and any number of routing managers 164. The systems depicted in FIGS. 4 and 5 and described below may be substantially like the clients 102-106 and to the components 112-164 of the machine-learning serving infrastructure 108.

The cluster 114 of software containers is a cluster 114 of routing containers 122-126, the cluster 116 of software containers is a cluster 116 of ranking serving containers 128-132, and the cluster 118 of software containers is a cluster 118 of recommending containers 134-138. Since the cluster 120 of software containers is a cluster 120 of scoring serving containers 140-152, the scoring serving container 140 includes the models 154-160 that are machine-learning models which learn to score. Each cluster 116-120 of serving containers may load a version of a type of machine-learning models. For example, the cluster 120 of scoring serving containers load a version of a type of machine-learning models 154-160 which share a library for scoring opportunities. In another example, the cluster 118 of recommending serving containers load a version of a type of machine-learning models which share a library for recommending opportunities to sales representatives. In yet another example, the cluster 116 of ranking serving containers load a version of a type of machine-learning models that share a library for ranking opportunities for each sales representative. Therefore, if a request from a tenant's application requires the services of these versions of machine-learning models, then any of the routing containers 122-126 can split the request into separate sub-requests, and then route the sub-requests to their corresponding clusters 116-120 of serving containers. Although these examples describe the clusters 116-120 of serving containers that serve one version of the scoring type of machine-learning models 140-152, one version of the recommending type of machine-learning models 134-138, and one version of the ranking type of machine-learning models 128-132, any clusters of any serving containers may serve any number of versions of any number of any types of any machine-learning models.

Upon startup, each of the serving containers 128-152 registers with the service directory 162 by providing the serving container's registration information, such as the host and/or the port. When any of the serving containers 128-152 is no longer available, or becomes unavailable (intentionally or unintentionally), the service discovery system 162 deletes the unavailable serving container's registration information. An available serving container may be referred to as an actual serving container. An available serving container can be an isolated computer program execution environment that is enabled by a computer's operating system, and which is currently able to execute the main functionality of a machine-learning model.

The service discovery system 162 may be implemented by HashiCorp Consul, Apache Zookeeper, Cloud Native Computing Foundation etcd, Netflix eureka, or any similar tool that provides a service discovery and/or a service registration system. The service discovery system 162 may not be designed to store a large amount of data, such as container information about each serving container and model information about each serving container's machine-learning models. The following is a hierarchy of data levels (1), (2), and (3) for virtual directories, files, or cnodes that can represent the container and model information for the serving containers A 128, B 130, . . . G 152, which the routing manager 164 uses to determine what to do at any point of time. Container information can be data about an isolated computer program execution environment that is enabled by a computer's operating system, and which executes the main functionality of a machine-learning model. Model information can be data about a computer system that scientifically studies algorithms and/or statistical models to perform a specific task effectively by relying on patterns and inference instead of using explicit instructions.

```
(1) /mlservices/cluster[i]/routing_manager
    /container1
    ...
    /containerN
    /master // <--- Container that will serve as routing manager master
(2) /mlservices/cluster[i]/scoring/version
        /model_mapping/containerA140
            /containerB142
            ...
            /containerG152
                /expected_models: {modelA154, modelB156... modelK}
                /actual_models: {modelA154, modelB156... modelN}
(2) /mlservices/cluster[i]/recommending/version
        /model_mapping/containerA134
            /containerB136
            ...
            /containerC138
                /expected_models: {modelA134, modelB136... modelK}
                /actual_models: {modelA134, modelB136... modelN}
(2) /mlservices/cluster[i]/ranking/version
        /model_mapping/containerA128
            /containerB130
            ...
            /containerC132
                /expected_models: {modelA128, modelB130... modelK}
                /actual_models: {modelA128, modelB130... modelN}
(3) /mlservices/cluster[i]/scoring/version
        /container_state
        /containerA140
        ...
        /containerG152//ephemeral node-if not there, the container is dead
        /stats: {modelA154:rps, modelB156:rps, modelC158:rps,modelD160:rps}
        /state
```

-continued

```
(3) /mlservices/cluster[i]/recommending/version
    /container_state
      /containerA134
      ...
      /containerC138//ephemeral node-if not there, the container is dead
        /stats: {model1: rps, model2: rps, ... modelN: rps}
        /state
(3) /mlservices/cluster[i]/ranking/version
    /container_state
      /containerA128
      ...
      /containerC132//ephemeral node- if not there, the container is dead
        /stats: {model1: rps, model2: rps, ... modelN: rps}
        /state
```

The routing manager 164 is deployed in a replicated fashion so that it will not become a single point of failure for the machine-learning serving infrastructure 108. However, only one instance of the routing manager 164 will act as a master, while other instances of the routing manager 164 will be in hot standby mode, ready to take over if the master instance of the routing manager 164 fails, based on the notification coming from the service discovery system 162 if mlservices/cluster[i]/routing_manager/master cnode is deleted.

The routing manager 164 makes decisions to load, rebalance, delete, distribute, and replicate machine-learning models in the serving containers 128-152, based on the following information. The data model's hierarchy level (2) in the service discovery system 162 provides information about which serving containers are expected to host specific machine-learning models and which serving containers actually host the specified machine-learning models. The routing manager 164 will push the list of expected machine-learning models to the model mapping hierarchy in the service discovery system 162. Each of the serving containers 128-152 will keep its own list of actual machine-learning models and if this list does not match the list of expected machine-learning models that a serving container receives, the serving container will load or delete any machine-learning models from the serving container's local cache as needed, and then update its own list of actual machine-learning models accordingly. Each of the routing containers 122-126 will listen for and maintain each serving container's list of actual machine-learning models to determine where to route requests.

The routing manager 164 analyzes the model information about each machine-learning model to decide whether to replicate frequently used machine-learning models to additional serving containers to prevent overloading the serving containers which are hosting the frequently used machine-learning models. The data model's hierarchy level (3) in the service discovery system 162 stores model information about each machine-learning model. The routing manager 164 uses the data model's hierarchy level (2) to manage lists of available machine-learning models and available serving containers. Every time a machine-learning model is loaded into a serving container's local cache, the serving container registers the machine-learning model in the data model's hierarchy level (2), in a reverse lookup: from the machine-learning model to the serving container. Therefore, the routing containers 122-126 can route requests for a particular machine-learning model to the serving container(s) that already loaded a copy of the particular machine-learning model into cache. A copy can be an entity that is made to be similar or identical to another entity. Each serving container also reports model information about its machine-learning models that is stored in the data model's hierarchy level (3), such as frequency of use expressed in terms of requests per second, which is model information that can be periodically (such as hourly) updated by the serving containers 128-152. The routing manager 164 retrieves and uses those updates of model information to make decisions about replicating, rebalancing, loading, and deleting machine-learning models.

For the following numerical examples, the size of the data that the service discovery system 162 keeps in memory is based on the following assumptions. Each cluster 116-120 of serving containers includes 100 serving containers, with 5 supported cluster versions per cluster type. Each of the serving containers 128-152 can hold up to 500 machine-learning models that each have a maximum replication of 5, such that every machine-learning model is replicated 5 times in the worst-case scenario.

/mls/cluster[i]/routing_manager stores 16 bytes of container information for 5 replications: 16 B*5=80 B of container information /mls/cluster[i]/scoring/version/model_mapping/containerN (on scoring container) stores 16 bytes of container information for 2 states (expected, actual) per model for 500 models per serving container: 16 B*2*500=16 KB of container information per serving container /mls/cluster[i]/scoring/version/model_mapping/stores 16 KB of container information per serving container for 100 serving containers per cluster version: 16 KB*100=1.6 MB of container information per cluster version /mls/cluster[i]/scoring/stores 1.6 MB of container information per cluster version for 5 cluster versions per cluster type: 1.6 MB*5=8 MB of container information per cluster type /mls stores 8 MB of container information per cluster type for 3 cluster types (scoring, recommending, and ranking): 8 MB*3=24 MB of container information /mls/cluster[i]/scoring/version/container_state/containerN (on scoring container) stores 21 bytes (16 bytes plus 4 int counter bytes plus 1 delimiter byte) of model information for 500 models per serving container: 21 B*500=10.5 KB of model information per serving container /mls/cluster[i]/scoring/version/container_state stores 10.5 KB of model information per serving container for 100 serving containers per cluster version: 10.5 KB*100=1.05 MB of model information per cluster version /mls/cluster[i]/scoring/stores 1.05 MB of model information per cluster version for 5 cluster versions per cluster type: 1.05 MB*5=5.25 MB of model information per cluster type /mls stores 5.25 MB of model information per cluster type for 3 cluster types (scoring, recommending, ranking): 5.25 MB*3=15.75 MB of model information The 24 MB of container information plus the 15.75 MB of model information equals a total of 39.75 MB of container information and model information stored by the routing manager 164. The 39.75 MB of container information and model information stored by the routing manager 164 is stored for 100 serving containers per cluster version, for 5 cluster versions per cluster type, and for 3 cluster types: 39.75 MB/(100*5*3)=the routing manager 164 stores 265 KB for each serving container.

Each of the routing containers 122-126 needs to store information for actual models only, instead of information for actual models and information for the expected models. Therefore, the size of storage for each of the routing containers 122-126 is 8 KB (instead of 16 KB) of container information per serving container for 100 serving containers per cluster version for by 5 cluster versions per cluster type for 3 cluster type: use cases: 8 KB*100*5*3=12 MB (instead of 24 MB) of container information and 15.75 MB of model information: 12 MB+15.75 MB=27.75 MB of container information and model information.

Internal representation may be further optimized for storing the information in each of the routing containers 122-126 when storing only actual models and metrics, which is 4 bytes of model metrics for 500 models per serving container for 100 serving containers per cluster version for 5 cluster versions per cluster type for 3 cluster types: =4 B*500*100*5*3=3 MB of model metrics. This further optimization results in 3 MB of actual models and metrics and 12 MB of actual container information: 3 MB+12 MB=15 MB of actual models and metrics and actual container information for each of the routing containers 122-126.

When the machine-learning serving infrastructure 108 adds any new cluster 116-120 of serving containers, any of the new serving containers 128-152 registers with the service discovery system 162 according to the data model (container_state), without any need to update the code in any of the routing containers 122-126. Since no machine-learning models are yet loaded on this new cluster, the routing containers 122-126 will not do any loading or rebalancing of machine-learning models on this new cluster. When the machine-learning serving infrastructure 108 discontinues or terminates any old cluster 116-120 of serving containers, the metadata for any of the old cluster's serving containers 128-152 is removed from the service discovery system 162 according to the data model (container_state and model_mapping). This removal of metadata will not initiate a rebalancing of machine-learning models because there are no machine-learning models that need to be moved or loaded again).

When the machine-learning serving infrastructure 108 adds any of the new serving containers 128-152 to any of the existing clusters 116-120 of serving containers, any of the new serving containers 128-152 updates the service discovery system 162 according to the data model (container_state). The watcher for the routing manager 164 will notify the routing manager 164 of any new serving container 128-152. Based on a model loading strategy, the routing manager 164 may respond to the notification by rebalancing the serving containers 128-152.

When any of the existing serving containers 128-152 in any of the existing clusters 116-120 of serving containers dies unexpectedly, or gracefully, the serving container's heartbeat to the service discovery system 162 fails. Then the machine-learning serving infrastructure 108 removes the ephemeral virtual directory, file, or cnode from the service discovery system 162, which updates the container_state in the service discovery system 162. The watcher for the routing manager 164 will notify the routing manager 164 of any unavailable serving container 128-152. Based on a model loading strategy, the routing manager 164 may respond to the notification by rebalancing the serving containers 128-152.

Each of the routing containers 122-126 has a watcher that watches the service discovery system 162 for changes in the available serving containers 128-152 in the clusters 116-120 of serving containers, and then provides notifications of any changes in the information about the serving containers 128-152 to its routing container 122-126 to update a map, or any similar data structure, of the available serving containers 128-152 asynchronously. The notified routing containers 122-126 will use their updated maps of the available serving containers 128-152 to route new requests, which are received via the gateway 112, to the available serving containers 128-152. A data structure can be the organization, management, and storage format of information which enables efficient access and modification.

If a new version of a machine-learning model is available, and a request from a tenant's application identifies the new version of the machine-learning model, then the routing manager 164 may identify any of the available serving containers 128-152 in the clusters 116-120 of serving containers that may have loaded a copy of the old version of the machine-learning model. The routing manager 164 will update the expected_models' information in the service discovery system 162, which may be used for loading the new version of the machine-learning model.

If the old version of the machine-learning model is to be discontinued, the routing manager 164 will change the routing metadata to route requests to the new version of the machine-learning model, such that the old version of the machine-learning model expires in cache. The routing manager 164 can use an Application Programming Interface (API) to unload the old model.

If no mapping exists for a requested machine-learning model in the service discovery system 162, then any of the routing containers 122-126 can route the request for the specific machine-learning model as the first request for the specific machine-learning model, by selecting one of the serving containers in the corresponding cluster for a version of the specific machine-learning model. The one serving container may be selected randomly, selected based on leveraging a bin-packing algorithm, or selected by leveraging a consistent hashing algorithm. If too many requests are received for a specific machine-learning model within the same time period, the service discovery system 162 can implement a lock to ensure that the routing containers 122-126 route only one request as the first request for the specific machine-learning model.

If mapping exists for a requested machine-learning model in the service discovery system 162, then any of the routing containers 122-126 can use a model loading strategy for loading machine-learning models into serving containers to determine the serving container to which the request will be routed. The model loading strategy may be based on leveraging various bin-packing algorithms or leveraging consistent hashing with bounded loads. After receiving a request for executing a machine-learning model, a serving container loads and executes the machine-learning model, and reports information about the machine-learning model to the service discovery system 162, which stores this model information in the data model's hierarchy level (3) and updates all the routing containers with this model information.

If model cache has expired in a serving container, a cache removal listener notifies the routing manager 164, which updates expected_models and actual_models in the model information of the serving container in the service discovery system 162. Based on the model loading strategy, the routing manager 164 may respond to the notification by rebalancing the models in the serving containers 128-152.

Figure 2:
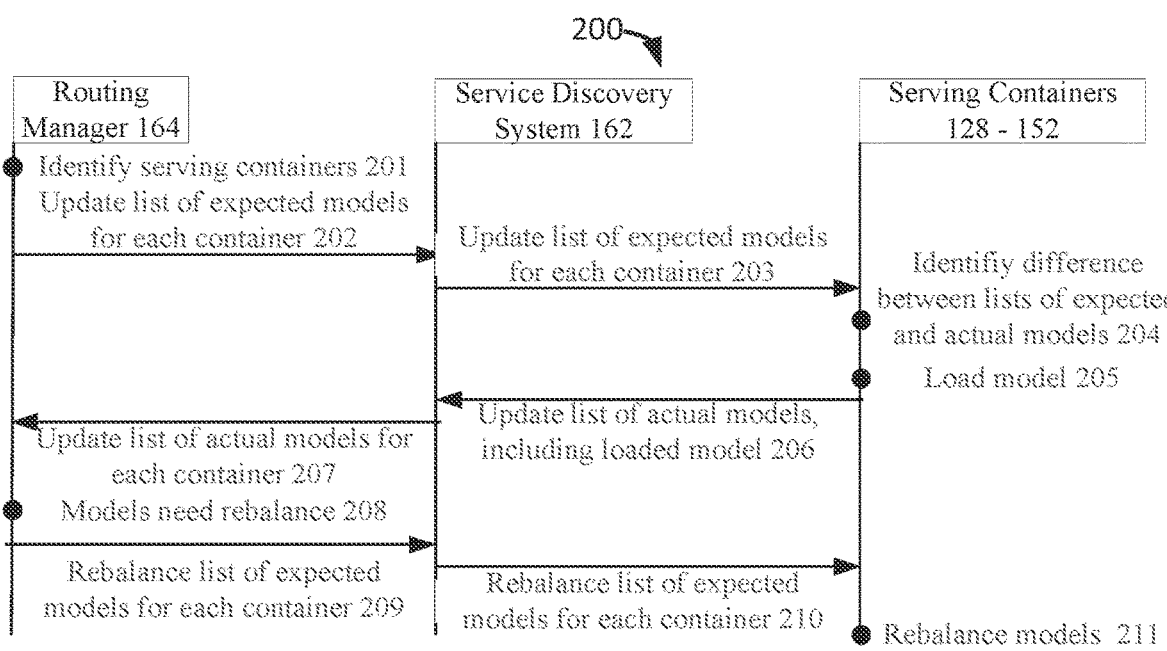
FIGS. 2-3 illustrate example load/unload API sequence diagrams for using container and model information to select containers for executing models, under an embodiment.

FIG. 2 depicts a sequence diagram 200 for a load API. Given an identifier of a machine-learning model M, the routing manager 164 executes a load API (PUT /v1.0/model/ {modelId}) which is responsible for identifying in which serving container S to load the machine-learning model M, at event 201. Due to the high loading latency for machine-learning models, this is an asynchronous call. The output of this request is the identification of the serving container S to load the machine-learning model M.

Then the routing manager 164 provides an updated list of the expected machine-learning models, including a copy of the machine-learning model M to be loaded, for each serving container to the service discovery system 162, at event 202. The service discovery system 162 provides the updated list of the expected machine-learning models, including a copy of the machine-learning model M to be loaded, for each serving container, to each serving container, including the identified serving container S, at event 203, The identified serving container S compares its updated list of the expected machine-learning models, including a copy of the machine-learning model M to be loaded, against its list of actual machine-learning models, and identifies the difference between the lists is a copy of the machine-learning model M to be loaded, at event 204. The identified serving container S loads the machine-learning model M, at event 205.

Next, the identified serving container S provides its updated list of actual machine-learning models, including a copy of the loaded machine-learning model M, to the service discovery system 162, at event 206. The service discovery system 162 sends the updated list of actual models loaded in serving containers, including a copy of the loaded machine-learning model M, to the routing manager 164, at event 207. The routing manager 164 determines that the machine-learning models need rebalancing, at event 208. The routing manager 164 provides a rebalanced list of the expected machine-learning models, including a copy of the loaded machine-learning model M, for each serving container to the service discovery system 162, at event 209. The service discovery system 162 provides the rebalanced list of expected machine-learning models, including a copy of the loaded machine-learning model M, for each serving container, to each serving container, including the identified serving container S, at event 210, The serving containers rebalance their models, at event 211.

Figure 3:
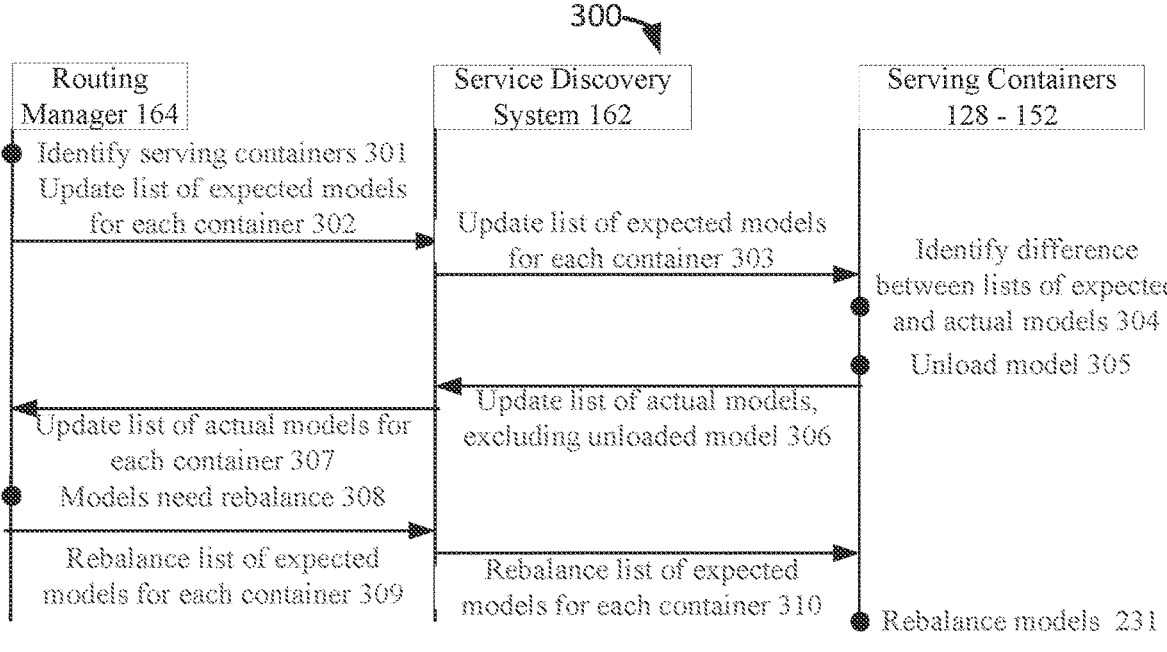

FIG. 3 depicts a sequence diagram 300 for an unload API. Given an identifier of a machine-learning model, the routing manager 164 executes an unload API (DELETE/v1.0/model/ {modelId}), which is responsible for identifying the serving container S in which a copy of the machine-learning model M is currently loaded, at event 301. The output of this request is the identification of the serving container S that should unload the machine-learning model M. The routing manager 164 provides an updated list of the expected machine-learning models, including a copy of the machine-learning model M to be unloaded, for each serving container to the service discovery system 162, at event 302.

Then the service discovery system 162 provides the updated list of the expected machine-learning models, including a copy of the machine-learning model M to be unloaded, for each serving container, to each serving container, including the identified serving container S, at event 303, The identified serving container S compares its updated list of the expected machine-learning models, excluding a copy of the machine-learning model M to be unloaded, against its list of actual machine-learning models, and identifies the difference between the lists is a copy of the machine-learning model M to be unloaded, at event 304. The identified serving container S unloads the machine-learning model M, at event 305. The identified serving container S provides its updated list of actual machine-learning models, which reflects the unloaded copy of machine-learning model M, to the service discovery system 162, at event 306.

Next, the service discovery system 162 sends the updated list of actual models loaded in serving containers, which reflects the unloaded copy of machine-learning model M, to the routing manager 164, at event 307. The routing manager 164 determines that the machine-learning models need rebalancing, at event 308. The routing manager 164 provides a rebalanced list of the expected machine-learning models, which reflects the unloaded copy of machine-learning model M, for each serving container to the service discovery system 162, at event 309. The service discovery system 162 provides the rebalanced list of the expected machine-learning models, which excludes the unloaded copy of machine-learning model M, for each serving container, to each serving container, including the identified serving container S, at event 310, The serving containers rebalance their machine-learning models, at event 311.

Figure 4:
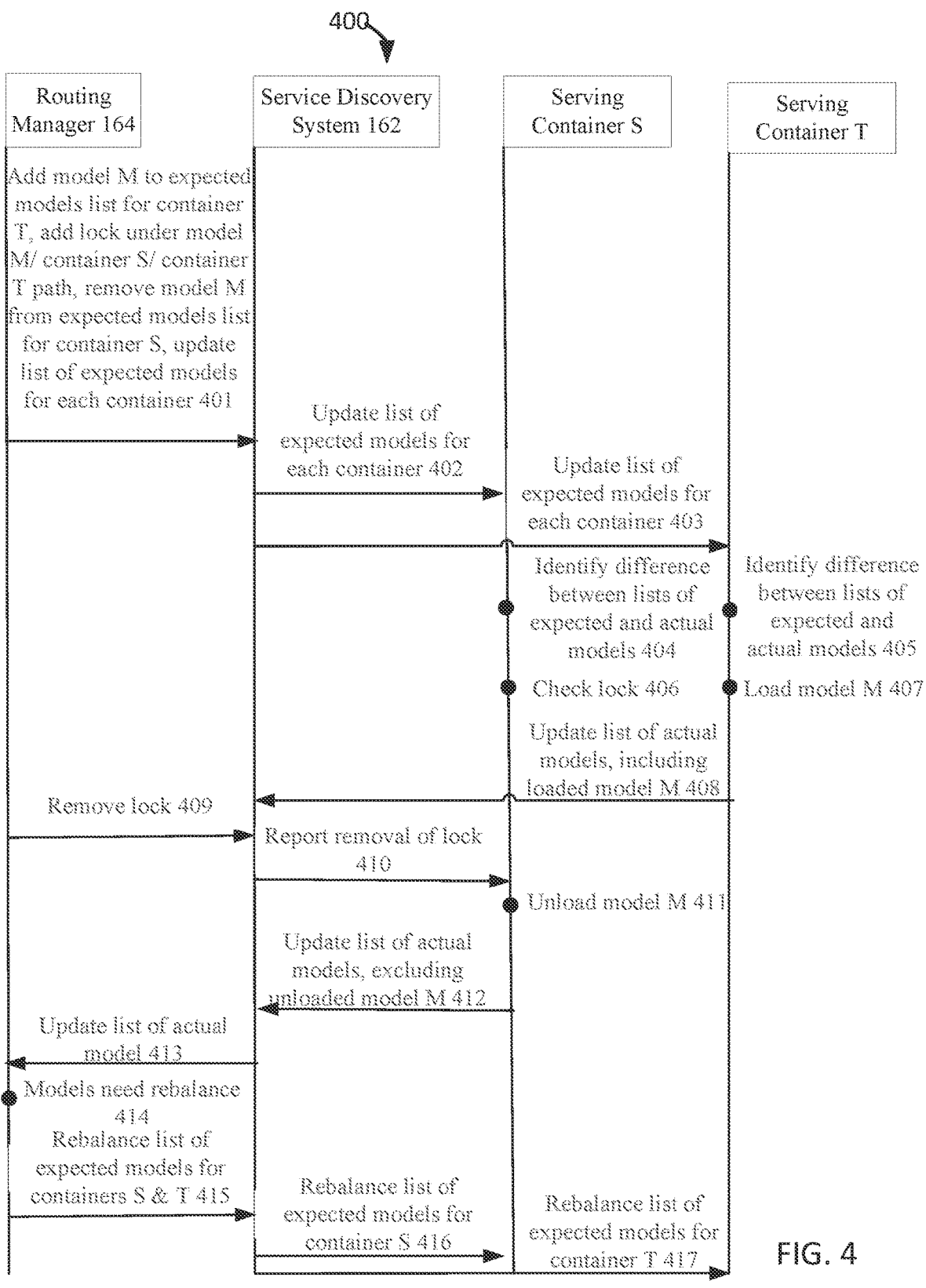
FIG. 4 illustrates an example move sequence diagram for using container and model information to select containers for executing models, under an embodiment.

When adding any new serving container 128-152 to any of the clusters 116-120, or rebalancing of the machine-learning models, the machine-learning serving infrastructure 108 needs to move some machine-learning models from one serving container to another serving container. Therefore, the machine-learning serving infrastructure 108 need to load the machine-learning model in the new serving container and then unload the machine-learning model from the old serving container so that the machine-learning model is not unavailable. FIG. 4 depicts a sequence diagram for moving a machine-learning model between serving containers. In the following example, the machine-learning model M needs to be moved from the source serving container S to the destination serving container T.

The routing manager 164 adds the machine-learning model M to the list of expected machine-learning models for the serving container T, adds a lock under the machine-learning model M/ serving container S/ serving container T path, removes the machine-learning model M from the list of expected machine-learning models for the serving container S, and provides an updated list of the expected machine-learning models, which reflects the machine-learning model M to be moved, for each serving container to the service discovery system 162, at event 401. The service discovery system 162 provides the updated lists of the expected machine-learning models, which reflects the machine-learning model M to be moved, for each serving container, to each serving container, including the source serving container S, at event 402, and the destination serving container T, at event 403, The source serving container S compares its updated list of expected machine-learning models, excluding the machine-learning model M to be unloaded, against its list of actual machine-learning models, and identifies the difference between the lists is a copy of the machine-learning model M to be unloaded, at event 404. The destination serving container T compares its updated list of expected machine-learning models, including a copy of the machine-learning model M to be loaded, against its list of actual machine-learning models, and identifies the difference between the lists is a copy of the machine-learning model M to be loaded, at event 405.

Then the source serving container S checks the lock under the machine-learning model M/ serving container S/ serving container T path, and then will wait until the lock is removed before unloading the machine-learning model M, at event 406. The destination serving container T loads the machine-learning model M, at event 407. The destination serving container T provides its updated list of actual machine-learning models, including a copy of the loaded machine-learning model M, to the service discovery system 162, at event 408. The routing manager 164 receives a notification from its watcher on the service discovery system 162, which identifies the destination serving container T's updated list of actual machine-learning models that includes a copy of the loaded machine-learning model M, removes the lock under the machine-learning model M/ serving container S/ serving container T path, and reports removal of the lock to the service discovery system 162, at event 409. The service discovery system 162 reports removal of the lock to the source serving container S, at event 410.

Next, the source serving container S unloads the machine-learning model M, at event 411. The source serving container S provides its updated list of actual machine-learning models, which reflects the unloaded copy of machine-learning model M, to the service discovery system 162, at event 412. The service discovery system 162 sends the updated list of actual models loaded in serving containers, which reflects the moved copy of machine-learning model M, to the routing manager 164, at event 413. The routing manager 164 determines that the machine-learning models need rebalancing, at event 414. The routing manager 164 provides a rebalanced list of the expected machine-learning models, which reflects the moved machine-learning model M, for each serving container to the service discovery system 162, at event 415. The service discovery system 162 provides the rebalanced list of the expected machine-learning models, which reflects the moved machine-learning model M, for each serving container, to each serving container, including the source serving container S, at event 416, and the destination serving container T, at event 417.

The machine-learning serving infrastructure 108 has n different serving containers with resource capacities $c_1, c_2, \ldots, c_n$ and m different machine-learning models with demands $d_1, d_2, \ldots, d_m$ on these resource capacities. Resource capacities are values specific to the n serving containers, such as memory, Central Processing Units (CPUs), and response per second. The routing manager 164 translates these serving containers' resource capacities and these machine-learning models' demands into defining a consistent mapping for each of the machine-learning models into their own serving containers so that the machine-learning serving infrastructure 108 can supply all these machine-learning models' demands based on the serving containers' resource capacities. The routing manager 164 manages each machine-learning model's lifecycle by considering the demand for each machine-learning model and the resource capacities of the serving containers to which the machine-learning models are mapped.

Such a mapping requires the following properties. The machine-learning models are mapped (or hashed) consistently to the same serving containers to reduce the system resources required to load the machine-learning models. Each serving container can only support up to its resource capacities. The routing manager 164 dynamically scales up and scales/down the replication factor for each machine-learning model to accommodate the demand for each machine-learning model. The routing manager 164 handles any serving containers' failures by re-balancing the failed serving container's machine-learning models into other serving containers.

If an application's request is received for a machine-learning model that is not defined anywhere in the model mapping of the data model's hierarchy, the routing containers 122-126 can forward the request to the routing manager 164 to include the requested machine-learning model into the overall scheme of the machine-learning model loading hierarchy. The routing manager 164 can responds by identifying a serving container to route the request to, routing the request to the identified serving container, and possibly changing the identified serving container's list of expected machine-learning models to include the previously undefined machine-learning model, which causes the identified serving container to load the requested machine-learning model. The routing manager 164 uses information provided in the data model's hierarchy level (2) to route requests for new machine-learning models to serving containers and determine the distribution of all machine-learning models across the serving containers.

When routing a request to any of the serving containers 128-152 in any of the clusters 116-120 of available serving containers, each of the routing containers 122-126 can use a model loading strategy for loading machine-learning models into serving containers. This model loading strategy determines which potential serving containers, of the available serving containers 128-152 in any of the clusters 116-120 of serving containers, are the potential destination serving containers for routing a request that requires execution of at least one machine-learning model. Strategies for loading machine-learning models in serving containers can be based on leveraging various bin-packing algorithms, each of which can be a process directed to a specific goal by putting several objects with different volumes into several containers with fixed volumes. A model loading strategy for loading machine-learning models can also leverage a consistent hashing algorithm, which can be an operation that can be used to repeatedly map specific data of arbitrary size to the same corresponding fixed-size values.

The routing manager 164 may leverage various bin-packing algorithms to route requests that require executing machine-learning models to serving containers. For example, leveraging the first fit bin-packing algorithm routes a copy of a machine-learning model to the first serving container that can be identified which has a sufficient level of resources to execute the copy of the machine-learning model. In another example, leveraging the best fit bin-packing algorithm routes a copy of a machine-learning model to the serving container that has the smallest level of resources to execute the copy of the machine-learning model. In yet another example, leveraging the worst fit bin-packing algorithm routes a copy of a machine-learning model to the serving container that has the largest level of available resources to execute the copy of the machine-learning model. In yet another example, leveraging a multi-dimensional bin-packing algorithm routes a copy of a machine-learning model into a serving container based on different criteria, such as the resource capacities for available cache, available CPU capacity, and the demand, such as requests per second. Given a list of machine-learning models with different available cache, available CPU capacity, and demand requirements, leveraging the multi-dimensional bin-packing algorithm routes these machine-learning models into a finite number of serving containers that each have their own specific available cache and available CPU capacity, to optimize the collective functioning of the serving containers that load these machine-learning models. The routing manager 164 can experiment with leveraging different bin-packing algorithms, and then select the most efficient bin-packing algorithm for each combination of resource capacities and demands.

In a general example of consistent hashing, a routing container uses a hash algorithm to hash the identifiers of each of the serving containers in a cluster of available serving containers onto corresponding hashed value locations on a hash ring, which may be referred to as a unit circle. Upon receiving a request from a tenant which requires the service of a specific machine-learning model, the routing container uses the same hash algorithm to hash the identifier of the specific machine-learning model to its corresponding hashed value location on the same hash ring. Then the routing container identifies the tenant's replication factor for the specific machine-learning model and equates the replication factor to the number of the serving containers that will be identified as the potential subset of the serving containers, from the cluster of available serving containers, for loading the specific machine-learning model. Beginning from the same hash ring's hashed value location for the specific machine-learning model, the routing container traverses the hash ring, identifying the hashed value locations on the hash ring to which the identifiers of the serving containers have been hashed, until the number of hashed value locations to which the identifiers of the serving containers have been hashed equals the tenant's replication factor for the specific machine-learning model. Then the routing container identifies the serving containers that correspond to these locations on the hash ring as the serving containers that will potentially load the specific machine-learning model. The routing container will traverse the hash ring consistently in the same direction that values are assigned to the hash ring, either always clockwise or always counterclockwise. An identifier can be a sequence of characters used to refer to a computer program or an element, such as a variable or a set of data, within the program.

A model loading strategy for loading machine-learning models in serving container can leverage consistent hashing with bounded load to bound the load for the machine-learning models on each serving container. As described above, a routing container identifies the serving containers that will potentially load a requested machine-learning model by traversing a hash ring until the number of the hashed value locations traversed on the hash ring equals the requesting tenant's replication factor for the requested machine-learning model. Next, the routing container selects the first hashed value location traversed on the hash ring, and then evaluates whether the serving container that corresponds to the first hashed value location traversed on the hash ring has a threshold level of resource capacities to execute the requested machine-learning model. If this serving container has the threshold level of resource capacities to execute the requested machine-learning model, then the routing container routes the request to this serving container.

If this serving container does not have the threshold level of resource capacities to execute the requested machine-learning model, the routing container selects the next hashed value location traversed on the hash ring, and then evaluates whether the serving container that corresponds to the next hashed value location traversed on the hash ring has the threshold level of resource capacities to execute the requested machine-learning model. The routing container continues traversing the hash ring and evaluating whether the subsequent serving container has the threshold level of resource capacities to execute the requested machine-learning model until the routing container identifies a serving container that has the threshold level of resource capacities to execute the requested machine-learning model. Upon identifying such a serving container, the routing container routes the request to the identified serving container, and then adjusts the resource capacities for the identified serving container and the resource capacities of the cluster of the identified serving container.

FIG. 5 illustrates an example request/response sequence diagram for using container and model information to select containers for executing models. Upon initiation, the serving containers 128-152 register their container information with the service discovery system 162, at event 501. On an as-needed basis, the serving containers 128-152 load their expected machine-learning models, unload their deleted machine-learning models, and update their container information and their model information in the data model's hierarchy levels stored by the service discovery system 162, at event 502.

The service discovery system 162 updates the container information and the model information in the data model hierarchy levels stored by the routing manager 164, the hot standby routing managers, and the routing containers 122-126, at events 503, 504, and 505, respectively. The gateway 112 dispatches a request from an application to the routing containers 122-126, at event 506. One of the routing containers 122-126 identifies machine-learning models that are required to be executed on behalf of the request, identifies the serving containers to execute the machine-learning models, splits the request into sub-requests, and sends the sub-requests to the serving containers 128-152, at event 507. The routing containers 122-126 can also request the routing manager 164 to load any unknown machine-learning model, at event 508.

The serving containers 128-152 execute their requested machine-learning models, and then respond to the sub-requests via one of the routing containers 122-126, at event 509. One of the routing containers 122-126 combines the responses, and then sends the combined response via the gateway 112, at event 510. If responding to the request changed any model information, the serving containers 128-152 update their changed model information in the data model's hierarchy levels stored by the service discovery system 162 at event 511. Therefore, if needed, the routing manager 164 rebalances the expected machine-learning models list, and then sends the rebalanced list to the data model's hierarchy levels stored by the service discovery system 162, at event 512.

Figures 6A, 6B:
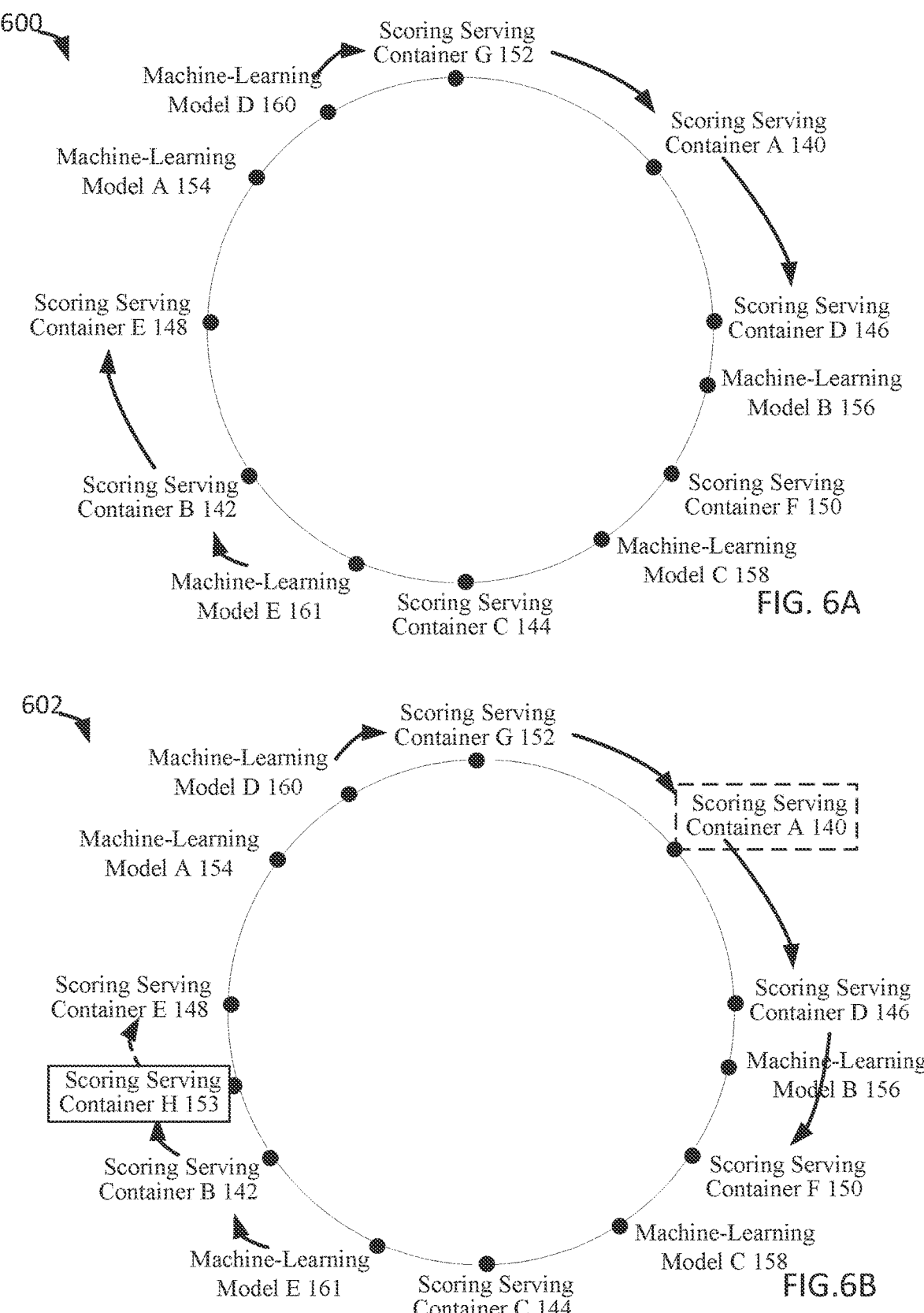
FIGS. 6A-B illustrate diagrams of example hash rings for using container and model information to select containers for executing models, under an embodiment.

FIG. 6A depicts an example scoring hash ring 600 for copies of scoring machine-learning models that need to be executed by scoring serving containers to respond to requests from applications. The routing container 122 applies the consistent hash algorithm to the identifier of a copy of the scoring machine-learning model D 160 to determine its hash value, and then determines that the location of this hash value on the scoring hash ring 600 is before the location of the hash value of the scoring serving container G 152 in the hash ring. In this case, since the replication factor for the scoring machine-learning model D 160 is three, the routing container 122 selects the next three locations of the next three hash values on the scoring hash ring 600, which correspond to the scoring serving container G 152 the scoring serving container A 140, and the scoring serving container D 146 as the potential containers for executing a copy of the scoring machine-learning model D 160.

The routing container 122 can leverage a consistent hashing algorithm with a bounded load by selecting the first hashed value location traversed on the scoring hash ring 600, and then evaluating whether the scoring serving container G 152 that corresponds to the first hashed value location traversed on the scoring hash ring 600 has the threshold level of resource capacities to execute a copy of the scoring machine-learning model D 160. If this scoring serving container G 152 has the threshold level of resource capacities to execute a copy of the requested scoring machine-learning model D 160, then the routing container 122 routes the request to this scoring serving container G 152. If this scoring serving container G 152 does not have the threshold level of resource capacities to execute a copy of the requested scoring machine-learning model D 160, the routing container 122 selects the next hashed value location traversed on the scoring hash ring 600, and then evaluates whether the scoring serving container A 140 that corresponds to the next hashed value location traversed on the scoring hash ring 600 has the threshold level of resource capacities to execute a copy of the requested scoring machine-learning model D 160. If this scoring serving container A 140 has the threshold level of resource capacities to execute a copy of the requested scoring machine-learning model D 160, then the routing container 122 routes the request to this scoring serving container A 140. If this scoring serving container A 140 does not have the threshold level of resource capacities to execute a copy of the requested scoring machine-learning model D 160, the routing container 122 selects the subsequent hashed value location traversed on the scoring hash ring 600, and then evaluates whether the scoring serving container D 146 that corresponds to the subsequent hashed value location traversed on the scoring hash ring 600 has the threshold level of resource capacities to execute a copy of the requested scoring machine-learning model D 160.

The routing container 122 may follow the sequence of selecting the first hashed value location traversed on the scoring hash ring 600 to evaluate the corresponding scoring serving container G 152, selecting the second hashed value location traversed on the scoring hash ring 600 to evaluate the corresponding scoring serving container A 140, and selecting the third hashed value location traversed on the scoring hash ring 600 to evaluate the corresponding scoring serving container D 146, until identifying that one of the scoring serving containers 140-152 has the threshold level of resource capacities to execute a copy of the scoring machine-learning model D 160. Since multiple serving containers could potentially execute a requested machine-learning model, a routing container can implement a round-robin strategy, rotating container strategy, or any other strategy that may be aligned with usual load balancing strategies. For example, each of the routing containers 122-126 can use a different seed value, so that not all of them implement the same round-robin strategy starting from the same serving container. In this example, the three routing containers 122-126 are responsible for routing requests to the seven scoring serving containers 140-152, corresponding to the locations of their hashed values on the scoring hash ring 600. Then the first routing container 122 may evaluate these scoring serving containers in the order of the scoring serving containers G152, A 140, D 146 . . . ; the second routing container 124 may evaluate these scoring serving containers in the order of the scoring serving containers A 140, D 146, F150 . . . ; and the third routing container 126 may evaluate the scoring serving containers in the order of the scoring serving containers D 146, F150, C 144 . . . .

Therefore, a routing container can evaluate serving containers in a different order of evaluation than another routing container evaluates the same serving containers.

If the selected serving container has already loaded a copy of the specific machine-learning model, and the selected serving container is not currently executing the specific machine-learning model for another request, the selected serving container executes a copy of the specific machine-learning model that has been pre-loaded in cache to provide a service for the new request. If a copy of the selected serving container has not already loaded the specific machine-learning model, the selected serving container loads the specific machine-learning model in cache, and then executes a copy of the specific machine-learning model that was just loaded in cache to provide a service for the new request. If the selected serving container is currently executing the specific machine-learning model for another request, then depending on the current resource capacities of the selected serving container, the selected serving container can wait until it is finished executing the specific machine-learning model for the other request before executing the specific machine-learning model in cache for the new request, can load an additional copy of the specific machine-learning model in cache, or can request for one of the other potential serving containers to load the specific machine-learning model in cache. Once verified to be loaded in cache, a copy of the specific machine-learning model is executed to provide a service for the new request.

If needed, a routing container combines any sub-responses to any sub-requests into one response for one request. A routing container routes any response(s) from any cluster(s) of available serving containers to the requesting tenant's application.

A routing container can perform load balancing if any serving container is added to and/or subtracted from a cluster of available serving containers. For a pre-load balancing example, FIG. 6A depicts the example scoring hash ring 600 for a copy of the scoring machine-learning model E 161 (which is not depicted in FIG. 1) that was loaded to provide a service for a request from a tenant's application. The routing container 122 applied the consistent hash algorithm to the identifier of a copy of the scoring machine-learning model E 161 to determine its hash value, and then determined that the location of this hash value on the scoring hash ring 600 is before the location of the hash value of the scoring serving container B 142 in the hash ring. In this case, the routing container 122 selected the next three locations of the next three hash values on the scoring hash ring 600, which corresponded to the scoring serving container B 142, the scoring serving container E 148, and the scoring serving container G 152 as the order of the first, second, and third potential scoring serving containers to evaluate for loading a copy of the scoring machine-learning model E 161.

In another pre-load balancing example, as described above, FIG. 6A depicts the example scoring hash ring 600 for a copy of the scoring machine-learning model D 160 that was loaded to provide another service for another request from another tenant's application. The routing container 122 applied the consistent hash algorithm to the identifier of a copy of the scoring machine-learning model D 160 to determine its hash value, and then determined that the location of this hash value on the scoring hash ring 600 is before the location of the hash value of the scoring serving container G 152 in the scoring hash ring 600. In this case, the routing container 122 selected the next three locations of the next three hash values on the scoring hash ring 600, which corresponded to the scoring serving container G 152, the scoring serving container A 140, and the scoring serving container D 146 as the order of the first, second, and third potential scoring serving containers to evaluate for loading a copy of the scoring machine-learning model D 160.

The routing container 122 performs load balancing when the scoring serving container A 140 is subtracted from the cluster 116 of scoring serving containers and when the scoring serving container H 153 (which is not depicted in FIG. 1) is added to the cluster 116 of scoring serving containers. For example, FIG. 6B depicts an example scoring hash ring 602 for a copy of the scoring machine-learning model D 160 that is requested by a tenant's application. The routing container 122 applies the consistent hash algorithm to the identifier of a copy of the scoring machine-learning model D 160 to determine its hash value, and then determines that the location of this hash value on the scoring hash ring 602 is before the location of the hash value of the scoring serving container G 152 in the hash ring.

In this case, the routing container 122 selects the next three locations of the next three hash values on the hash ring 202 as the order of the first, second, and third potential scoring serving containers to evaluate for loading a copy of the scoring machine-learning model D 160. These three locations correspond to the scoring serving container G 152 as the first potential scoring serving container to evaluate for loading a copy of the scoring machine-learning model D 160, would have corresponded to the scoring serving container A 140 as the second potential scoring serving container to evaluate for loading a copy of the scoring machine-learning model D 160. and would have also corresponded to the scoring serving container D 146 as the third potential scoring serving container to evaluate for loading a copy of the scoring machine-learning model D 160. However, since the scoring serving container A 140 is unavailable in this example, the routing container 122 selects the next two location of the next two hash values on the scoring hash ring 602, which corresponds to the scoring serving container D 146 as the second potential scoring serving container to evaluate for loading a copy of the scoring machine-learning model D 160, and also corresponds to the scoring serving container F 150 as the third potential scoring serving container to evaluate for loading a copy of the scoring machine-learning model D 160. In this example, the routing container 122 performs load balancing when the scoring serving container A 140 is subtracted from the cluster 116 of scoring serving containers by identifying the scoring serving container D 146 and the scoring serving container F 150, instead of the currently unavailable scoring serving container A 140 and the scoring serving container D 146, as the second and third potential containers to evaluate for loading a copy of the scoring machine-learning model D 160.

In another example, FIG. 6B depicts the example scoring hash ring 602 for a copy of the scoring machine-learning model E 161 that is requested by a tenant's application. The routing container 122 applies the consistent hash algorithm to the identifier of a copy of the scoring machine-learning model E 161 to determine its hash value, and then determines that the location of this hash value on the scoring hash ring 602 is before the location of the hash value of the scoring serving container B 142 in the scoring hash ring 602. In this case, the routing container 122 selects the next three locations for the next three hash values on the scoring hash ring 602, which correspond to the scoring serving container B 142 as the first potential scoring serving container to evaluate for loading a copy of the scoring machine-learning model E 161. The second hash value would have corresponded to the scoring serving container E 148 as the second potential scoring serving container to evaluate for loading a copy of the scoring machine-learning model E 161, and the third hash value would have corresponded to the scoring serving container G 152 as the third potential scoring serving container to evaluate for loading a copy of the scoring machine-learning model E 161.

However, the location of the hash value for the new scoring serving container H 153 is between the locations of the hash values for the scoring serving container B 142 and the scoring serving container E 148 on the scoring hash ring 602. Therefore, the routing container 122 selects the next location for the next hash value after the location for the hash value for the scoring serving container B 142 on the scoring hash ring 602, which corresponds to the new scoring serving container H 153 as the second potential scoring serving container to evaluate for loading a copy of the scoring machine-learning model E 161. In this example, the routing container 122 performs load balancing when the new scoring serving container H 153 is added to the cluster 116 of scoring serving containers by identifying the new scoring serving container H 153, instead of the scoring serving container E 148 as the second potential scoring serving container to evaluate for loading a copy of the scoring machine-learning model E 161.

FIGS. 7 A-B depict an operational flow diagram illustrating a high-level overview of a method 700 for using container and model information to select containers for executing models. The method 700 may be implemented on either a centralized computing platform or in parallel on a distributed computing platform.

A data structure is optionally updated with model information associated with machine learning models corresponding to any serving containers in any cluster of serving containers and/or container information associated with serving containers in any corresponding cluster of serving containers, box 702. The system can update information about available serving containers and their machine-learning models. In embodiments, this can include the service discovery system 162 receiving the container information and the model information from each of the serving containers 128-152 in the clusters 116-120 of serving containers, which the service discovery system 162 updates in the data model's hierarchy levels (2) and (3). This information may indicate the available cache capacity for each serving container based on each serving container's initial cache capacity and the size of every machine-learning model that each serving container has currently loaded into its cache. This information may also indicate the available CPU capacity for each serving container based on each serving container's initial CPU capacity, as approximated by its historically high rate of responses to requests per second and based on the current rate of responses per second of every machine-learning model that a serving container has currently loaded into its cache.

In addition to optionally updating container information and model information for serving containers that are available to execute machine-learning models, a request is received from an application, box 704. The system receives many requests that can require the execution of machine-learning models. For example, and without limitation, this can include the machine-learning serving infrastructure 108 receiving a request for scoring a list of purchasable contacts as Acme Corporation's business opportunities. The request is from a Customer Relationship Management (CRM) application executed by an Acme sales manager Ann on her laptop computer 104. Ann's request also requires that the scored business opportunities be recommended to various Acme sales representatives, such as Bob.

After a request is received, a version is identified of a machine-learning model associated with the request, box 706. The system identifies a version of a machine-learning model to be executed. By way of example and without limitation, this can include the machine-learning serving infrastructure 108 identifying that Ann's request requires executing a version of the opportunity scoring machine-learning model A 154 used by Acme's CRM application.

Following receipt of a request, another version is optionally identified of another machine-learning model associated with the request, box 708. The system can identify multiple versions of machine-learning models to be executed. In embodiments, this can include the machine-learning serving infrastructure 108 identifying that Ann's request also requires executing a version of the opportunity recommending machine-learning model used by Acme's CRM application. Therefore, the machine-learning serving infrastructure 108 splits Ann's request into sub-requests due to identifying both a version of Acme's opportunity scoring machine-learning model A 154 and a version of Acme's opportunity recommending machine-learning model.

Having identified a version of a machine-learning model, model information is identified as associated with machine learning models corresponding to a cluster of available serving containers associated with the version of the machine-learning model, box 710. The system identifies a cluster of available serving containers that serve a version of the identified machine-learning model and information about the cluster's machine-learning models. For example, and without limitation, this can include the routing container 122 identifying model information that indicates the sizes of and responses per second for every scoring machine learning model loaded in the cache of each scoring serving container in the cluster 120 of the scoring serving containers A 140-G 152.

In addition to identifying another version of another machine-learning model, model information is optionally identified as associated with machine learning models corresponding to a cluster of available serving containers associated with the other version of the other machine-learning model, box 712. The system can identify another cluster of available serving containers that serve a version of another identified machine-learning model and the model information about the other cluster's machine-learning models. By way of example and without limitation, this can include the routing container 122 identifying model information that indicates the sizes of and responses per second for every recommending machine learning model loaded in the cache of each recommending serving container in the cluster 118 of the recommending serving containers A 134-C 138.

After identifying model information about machine learning models in a cluster of available serving containers, the model information is used to select a serving container from the cluster of available serving containers, box 714. The system uses model information to select one of the serving containers in a cluster. In embodiments, this can include the routing manager 164 applying a multi-dimensional bin-packing algorithm to the model information to select the scoring serving container D 146 that has the largest combination of available cache and available CPU capacity to execute a copy of Acme's opportunity scoring machine-learning model A 154, from the cluster of available scoring serving containers A 140-G 152.

Although this example described the application of a multi-dimensional bin-packing algorithm to select the scoring serving container D 146, the routing manager 164 could have applied a worst fit bin-packing algorithm to the model information to select the scoring serving container D 146 that has the largest level of available CPU capacity to execute a copy of Acme's opportunity scoring machine-learning model A 154, from the cluster of available scoring serving containers A 140-G 152. In another example, the routing manager 164 could have applied a best fit bin-packing algorithm to the model information to select the scoring serving container A 140 that has the smallest level of available cache to load a copy of Acme's opportunity scoring machine-learning model A 154, from the cluster of available scoring serving containers A 140-G 152. Additionally, the routing manager 164 could have applied a first fit bin-packing algorithm to the model information to select the scoring serving container A 140 that is the first scoring serving container to be evaluated which has a sufficient level of available cache to load a copy of Acme's opportunity scoring machine-learning model A 154, from the cluster of available scoring serving containers A 140-G 152.

In an alternative example, the routing container 122 uses a consistent hashing algorithm to identify the scoring serving containers A 140, D 146, and F 150, as the first, second, and third scoring serving containers to evaluate for loading a copy of Acme's opportunity scoring machine-learning model A 154, from the cluster 120 of available scoring serving containers A 140, B 142, C 144, D 146, E 148. F 150, and G 152, which can load or have loaded a copy of any scoring machine-learning model that shares the same library to generate the scores of business opportunities. Then the routing container 122 evaluates the available cache and available CPU capacity of the scoring serving container A 140 from the scoring serving containers A 140-G 152, which can load or have loaded a copy of Acme's opportunity scoring machine-learning model A 154.

The data model's hierarchy level (3) indicates that although the scoring serving container A 140 has sufficient cache to load a copy of Acme's opportunity scoring machine-learning model A 154, the aggregate size of all the scoring machine-learning models loaded in the cache of the scoring serving container A 140 is greater than the maximum allowable load for optimal operations. Therefore, the routing manager 164 selects the next hashed value location traversed on the scoring hash ring 200, and then evaluates whether the scoring serving container D 146 that corresponds to the next hashed value location traversed on the scoring hash ring 200 has loads on its available cache and available CPU capacity above the maximum allowable loads. The data model's hierarchy level (3) indicates that the scoring serving container D 146 has the largest combination of available cache and available CPU capacity to execute a copy of Acme's opportunity scoring machine-learning model A 154. Therefore, the routing container 122 routes the scoring sub-request to the scoring serving container D 146, and then adjusts the available cache and available CPU capacity in the data model's hierarchy level (3) for the scoring serving container D 146 and the available cache and available CPU capacity of the cluster 120 of the scoring serving container D 146.

Following identification of model information about machine learning models in another cluster of available serving containers, this model information is optionally used to select another serving container from the other cluster of available serving containers, box 716. The system can use model information to select one of the other serving containers. For example, and without limitation, this can include the routing manager 164 applying a multi-dimensional bin-packing algorithm to the model information to select the recommending serving container B 136 that has the largest combination of available cache and available CPU capacity to execute a copy of Acme's opportunity recommending machine-learning model, from the cluster 118 of available recommending serving containers A 134-C 138.

In an alternative example, the routing container 122 uses the same consistent hashing algorithm to identify the recommending serving containers C 138, B 136, and A 134 as the first, second, and third recommending serving containers to evaluate for loading a copy of Acme's opportunity recommending machine-learning model, from the cluster 118 of recommending serving containers A 134, B 136, and C 138, which can load or have loaded a copy of any recommending machine-learning model that shares the same library to generate recommendations of business opportunities. Then the routing container 122 first evaluates the available cache and the available CPU capacity of the recommending serving container C 138 from the recommending serving containers A 134, B 136, and C 138, which can load or have loaded a copy of Acme's opportunity recommending machine-learning model.

The data model's hierarchy level (3) indicates that although the recommending serving container C 138 has sufficient CPU capacity to execute a copy of Acme's recommending machine-learning model, the aggregate responses per second, which reflect current CPU capacities, of all the recommending machine-learning models loaded in the cache of the recommending serving container C 138 is greater than the maximum allowable load for optimal operations. Therefore, the routing container 122 selects the next hashed value location traversed on the recommending hash ring, and then evaluates whether the recommending serving container B 136 that corresponds to the next hashed value location traversed on the recommending hash ring has loads on its the available cache and available CPU capacity above the maximum allowable loads. The data model's hierarchy level (3) indicates that the recommending serving container B 136 has the largest combination of available cache and available CPU capacity to execute a copy of Acme's opportunity recommending machine-learning model, from the cluster 118 of available recommending serving containers A 134-C 138. Therefore, the routing container 122 routes the recommending sub-request to the recommending serving container B 136, and then adjusts the available cache and available CPU capacity in the data model's hierarchy level (3) for the recommending serving container B 136 and the available cache and available CPU capacity of the cluster 118 of the recommending serving container B 136.

Having selected a serving container, a determination is made whether the identified machine-learning model is loaded in the serving container, box 718. The system determines whether the selected serving container needs to load the identified machine-learning model. By way of example and without limitation, this can include the routing container 122 determining whether the scoring serving container D 146 has loaded a copy of Acme's opportunity scoring machine-learning model A 154. If a copy of the identified machine-learning model is not loaded in the selected serving container, the method 700 continues to block 720 to load the identified machine-learning model in the selected serving container. If a copy of the identified machine-learning model is loaded in the selected serving container, the method 700 proceeds to block 722 to execute the identified machine-learning model in the selected serving container.

If a copy of the identified machine-learning model is not loaded in the selected serving container, a copy of the identified machine-learning model is loaded in the selected serving container, box 720. The system can load the identified machine-learning model in the selected serving container if needed. In embodiments, this can include the scoring serving container D 146 loading a copy of Acme's opportunity scoring machine-learning model A 154.

If a copy of the identified machine-learning model is loaded in the selected serving container, the identified machine-learning model is executed in the selected serving container on behalf of the request, box 722. The system executes the identified machine-learning model in the selected serving container. For example, and without limitation, this can include a copy of Acme's opportunity scoring machine-learning model A 154 scoring the purchasable business contacts as Acme's business opportunities, after a copy of Acme's opportunity scoring machine-learning model A 154 is verified as loaded in the scoring serving container D 146.

In addition to selecting another serving container, a determination is optionally made whether a copy of the other identified machine-learning model is loaded in the other selected serving container, box 724. The system can determine whether the other selected serving container needs to load a copy of the other identified machine-learning model. By way of example and without limitation, this can include the routing container 122 determining whether a copy of the recommending serving container B 136 has loaded a copy of Acme's opportunity recommending machine-learning model. If a copy of the other identified machine-learning model is not loaded in the other selected serving container, the method 700 continues to block 726 to load a copy of the other identified machine-learning model in the other selected serving container. If a copy of the other identified machine-learning model is loaded in the other selected serving container, the method 700 proceeds to block 728 to execute a copy of the other identified machine-learning model in the other selected serving container.

If a copy of the other identified machine-learning model is not loaded in the other selected serving container, a copy of the other identified machine-learning model is optionally loaded in the other selected serving container, box 726. The system can load the other identified machine-learning model in the other selected serving container. In embodiments, this can include the recommending serving container B 136 loading a copy of Acme's opportunity recommending machine-learning model.

If a copy of the other identified machine-learning model is loaded in the other selected serving container, a copy of the other identified machine-learning model is optionally executed in the other selected serving container on behalf of the request, box 728. The system can execute the other identified machine-learning model in the other selected serving container. For example, and without limitation, this can include a copy of Acme's opportunity recommending machine-learning model recommending the purchasable business contacts as Acme's business opportunities to Acme's sales representatives, after a copy of Acme's opportunity recommending machine-learning model is verified as loaded in the recommending serving container B 136.

After executing a copy of the identified machine-learning model in the selected serving container on behalf of a request, the request is responded to, based on executing the identified machine-learning model on behalf of the request, box 730. The system responds to a request by executing a copy of the identified machine-learning model(s) in the selected serving container(s). By way of example and without limitation, this can include the machine-learning serving infrastructure 108 responding to Ann's request with the scored list of purchasable contacts as Acme Corporation's business opportunities, which are recommended to various Acme sales representatives, such as Bob.

In addition to receiving a request from an application, an additional request is optionally received from the same application, box 732. The system can receive many requests that can require the execution of machine-learning models. In embodiments, this can include the machine-learning serving infrastructure 108 receiving an additional request, which requires scoring some of last week's list of purchased contacts as Acme's business opportunities. The additional request is from Acme's CRM application executed by an Acme sales representative Bob on his mobile phone 106. Bob's request also requires that his scored business opportunities be ranked to determine his personal priorities for working on these business opportunities.

After an additional request is received, a version is optionally identified of a machine-learning model associated with the additional request, box 734. The system can identify a version of a machine-learning model to be executed. For example, and without limitation, this can include the machine-learning serving infrastructure 108 identifying that Bob's request requires executing a version of the opportunity scoring machine-learning model A 154 used by Acme's CRM application. The machine-learning serving infrastructure 108 may also identify that Bob's request also requires executing a version of the opportunity ranking machine-learning model used by Acme's CRM application. Therefore, the machine-learning serving infrastructure 108 may split Bob's request into sub-requests due to identifying both a version of Acme's opportunity scoring machine-learning model A 154 and a version of Acme's opportunity ranking machine-learning model.

Following an identification of a version of a machine-learning model, model information is optionally identified as associated with machine learning models corresponding to a cluster of available serving containers associated with the version of the machine-learning model, box 736. The system can identify the cluster of available serving containers that serve a version of the identified machine-learning model and the model information about the cluster's machine-learning models. By way of example and without limitation, this can include the routing container 124 identifying model information that indicates the sizes of and responses per second for every scoring machine learning model loaded in the cache of each scoring serving container in the cluster 120 of the scoring serving containers A 140-G 152. The routing container 126 may also identify model information that indicates the sizes of and responses per second for every ranking machine learning model loaded in the cache of each ranking serving container in the cluster 116 of the ranking serving containers A 128-C 132.

Having identified model information about machine learning models in a cluster of available serving containers, the model information is optionally used to select an additional serving container from the cluster of available serving containers, box 738. The system can use model information to select one of the serving containers. In embodiments, this can include the routing manager 164 applying a multi-dimensional bin-packing algorithm to the model information to select the scoring serving container D 146 that has the largest combination of available cache and available CPU capacity to execute a copy of Acme's opportunity scoring machine-learning model A 154, from the cluster 120 of available scoring serving containers A 140-G 152. The routing manager 164 may also apply a multi-dimensional bin-packing algorithm to the model information to select the ranking serving container C 132 that has the largest combination of available cache and available CPU capacity to execute a copy of Acme's opportunity ranking machine-learning model, from the cluster of available ranking serving containers A 128-C 132.

In an alternative example, the routing container 124 uses the same consistent hashing algorithm to identify the scoring serving containers G 152, A 140, and D 146 as the first, second, and third opportunity scoring machine-learning models to evaluate for loading a copy of Acme's opportunity scoring machine-learning model A 154, from the cluster 120 of available scoring serving containers A 140, B 142, C 144, D 146, E 148. F 150, and G 152, which can load or have loaded a copy of any scoring machine-learning model that shares the same library to generate the scores of business opportunities. The routing container 124 may also use the same consistent hashing algorithm to identify the ranking serving containers C 132, A 128, and B 130, as the first, second, and third ranking serving containers to evaluate for loading a copy of Acme's opportunity ranking machine-learning model, from the cluster 116 of ranking serving containers A 128, B 130, and C 132, which can load or have loaded a copy of any ranking machine-learning model that shares the same library to generate the rankings of business opportunities. Then the routing container 124 first evaluates the available cache and available CPU capacity of the scoring serving container G 152 from the scoring serving containers A 140, D 146, and G 152, which can load or have loaded a copy of Acme's opportunity scoring machine-learning model A 154.

The data model's hierarchy level (3) indicates that although the scoring serving container G 152 has sufficient CPU capacity to execute a copy of Acme's opportunity scoring machine-learning model A 154, the aggregate responses per second, which reflect available CPU capacities, of all the scoring machine-learning models loaded in the cache of the scoring serving container G 152 is greater than the maximum allowable load for optimal operations. Therefore, the routing container 124 selects the next hashed value location traversed on the scoring hash ring 200, and then evaluates whether the scoring serving container A 140 that corresponds to the next hashed value location traversed on the scoring hash ring 200 has loads on its available cache and available CPU capacity above the maximum allowable loads. The data model's hierarchy level (3) indicates that although the scoring serving container A 140 has sufficient cache to load a copy of Acme's opportunity scoring machine-learning model A 154, the aggregate size of all the scoring machine-learning models loaded in the cache of the scoring serving container A 140 is greater than the maximum allowable load for optimal operations. Therefore, the routing container 124 selects the next hashed value location traversed on the scoring hash ring 200, and then evaluates whether the scoring serving container D 146 that corresponds to the next hashed value location traversed on the hash ring 200 has loads on its available cache and available CPU capacity above the maximum allowable loads. The data model's hierarchy level (3) indicates that the scoring serving container D 146 has the largest combination of available cache and available CPU capacity to execute a copy of Acme's opportunity scoring machine-learning model A 154. Therefore, the routing container 124 routes the scoring sub-request to the scoring serving container D 146, and then adjusts the available cache and available CPU capacity in the data model's hierarchy level (3) for the scoring serving container D 146 and the available cache and available CPU capacity of the cluster 120 of the scoring serving container D 146.

The routing container 124 may first evaluate the available cache and available CPU capacity of the ranking serving container C 132 from the ranking serving containers C132, A 128, and B 130, which can load or have loaded a copy of Acme's opportunity ranking machine-learning model. The data model's hierarchy level (3) indicates that the ranking serving container C 132 has the largest combination of available cache and available CPU capacity to execute a copy of Acme's opportunity ranking machine-learning model, from the cluster of available ranking serving containers A 128-C 132. Therefore, the routing container 124 routes the ranking sub-request to the ranking serving container C 132, and then adjusts the available cache and available CPU capacity in the data model's hierarchy level (3) for the ranking serving container C 132 container and the available cache and available CPU capacity of the cluster 116 of the ranking serving container C 132.

The machine-learning serving infrastructure 108 can use the same consistent hashing algorithm to route Ann's sub-request for opportunity scoring and Bob's sub-request for opportunity scoring to the scoring serving containers G 152, A 140, and D 146 as the same first, second, and third scoring serving containers to evaluate for loading a copy of Acme's opportunity scoring machine-learning model A 154. However, the use of the same round-robin strategy with different seeds enables the routing containers 122 and 124 to select to first evaluate the different scoring serving containers A 140 and G152 for Ann's sub-request and Bob's sub-request, respectively. If these different scoring serving containers A 140 and G152 both had loads below the maximum allowable loads, the routing containers 122 and 124 would route their scoring sub-requests to these different scoring serving containers A 140 and G152, which could simultaneously execute their own copies of Acme's opportunity scoring machine-learning model A 154. Even if the same scoring serving container loaded different copies of Acme's opportunity scoring machine-learning model A 154 for Ann's sub-request and Bob's sub-request, the same scoring serving container could simultaneously execute both copies of Acme's opportunity scoring machine-learning model A 154.

In addition to selecting an additional serving container, a determination is optionally made whether a copy of the identified machine-learning model is loaded in the additional serving container, box 740. The system can determine whether the selected additional serving container needs to load a copy of the identified machine-learning model. For example, and without limitation, this can include the routing container 124 determining whether the scoring serving container D 146 has loaded a copy of Acme's opportunity scoring machine-learning model A 154. The routing container 124 may also determine whether the ranking serving container C 132 has loaded a copy of Acme's opportunity ranking machine-learning model. If a copy of the identified machine-learning model is not loaded in the additional selected serving container, the method 700 continues to block 742 to load a copy of the identified machine-learning model in the additional selected serving container. If a copy of the identified machine-learning model is loaded in the additional selected serving container, the method 700 proceeds to block 744 to execute the copy of the identified machine-learning model in the additional selected serving container.

If a copy of the identified machine-learning model is not loaded in the additional selected serving container, a copy of the identified machine-learning model is optionally loaded in the additional selected serving container, box 742. The system can load a copy of the identified machine-learning model in the selected additional serving container. By way of example and without limitation, this can include the scoring serving container D 146 loading a copy of Acme's opportunity scoring machine-learning model A 154. Also, the ranking serving container C 132 may load a copy of Acme's opportunity ranking machine-learning model.

If a copy of the identified machine-learning model is loaded in the additional selected serving container, the copy of the identified machine-learning model is optionally executed in the additional selected serving container on behalf of the additional request, box 744. The system can execute a copy of the identified machine-learning model in the additional selected serving container. In embodiments, this can include a copy of Acme's opportunity scoring machine-learning model A 154 scoring some of last week's purchased business contacts as Acme's business opportunities, after a copy of Acme's opportunity scoring machine-learning model A 154 is verified as loaded in the scoring serving container D 146. Also, a copy of Acme's opportunity ranking machine-learning model may rank some of last week's purchased business contacts to determine Bob's personal priorities for working on these business opportunities, after a copy of Acme's opportunity ranking machine-learning model is verified as loaded in the ranking serving container C 132.

After executing a copy of the identified machine-learning model in an additional selected serving container on behalf of an additional request, the additional request is optionally responded to, based on executing the copy of the identified machine-learning model on behalf of the additional request, box 746. The system can respond to an additional request by executing a copy of any identified machine-learning model(s) in any selected serving container(s). For example, and without limitation, this can include the machine-learning serving infrastructure 108 responding to Bob's request with his priority-ranked list of some of last week's purchased contacts.

In addition to receiving a request from an application, an extra request is optionally received from an extra application, box 748 The system can receive many requests that can require the execution of machine-learning models. By way of example and without limitation, this can include the machine-learning serving infrastructure 108 receiving an extra request, which requires scoring a list of purchasable contacts as Mega Corporation's business opportunities. The extra request is from a CRM application executed by a MegaCorp sales manager Chris on the desktop computer 102. Chris' request also requires that the scored business opportunities be recommended to various MegaCorp sales representatives, and that these scored business opportunities be ranked to determine each MegaCorp sales representatives' personal priorities for working on these business opportunities.

After an extra request is received, an extra version is optionally identified of an extra machine-learning model associated with the extra request, box 750. The system can identify a version of a machine-learning model to be executed. In embodiments, this can include the machine-learning serving infrastructure 108 identifying that Chris' request requires executing a version of the opportunity scoring machine-learning model E 161 used by MegaCorp's CRM application. The machine-learning serving infrastructure 108 may also identify that Chris' request also requires executing a version of the opportunity recommending machine-learning model used by MegaCorp's CRM application and a version of the opportunity ranking machine-learning model used by MegaCorp's CRM application. Therefore, the machine-learning serving infrastructure 108 may split Chris' request three ways into sub-requests due to identifying a version of MegaCorp's opportunity scoring machine-learning model, a version of MegaCorp's opportunity recommending machine-learning model, and a version of MegaCorp's opportunity ranking machine-learning model.

Following an identification of an extra version of an extra machine-learning model, model information is optionally identified as associated with machine learning models corresponding to a cluster of available serving containers associated with both the extra version of the extra machine-learning model and the identified version of the identified machine-learning model, box 752. The system can identify the cluster of available serving containers that serve a version of the identified machine-learning model and the model information about the cluster's machine-learning models. For example, and without limitation, this can include the routing container 126 identifying model information that indicates the sizes of and responses per second for every scoring machine learning model loaded in the cache of each scoring serving container in the cluster 120 of the scoring serving containers A 140-G 152. The routing container 126 may also identify model information that indicates the sizes of and responses per second for every recommending machine learning model loaded in the cache of each recommending serving container in the cluster 118 of the recommending serving containers A 134-C 138. The routing container 126 may further identify model information that indicates the sizes of and responses per second for every ranking machine learning model loaded in the cache of each ranking serving container in the cluster 116 of the ranking serving containers A 128-C 132.

Having identifying model information about machine learning models in an extra cluster of available serving containers, the model information is optionally used to select an extra serving container from the cluster of available serving containers, box 754. The system can use model information to select one of the serving containers. By way of example and without limitation, this can include the routing manager 164 applying a multi-dimensional bin-packing algorithm to the model information to select the scoring serving container D 146 that has the largest combination of available cache and available CPU capacity to execute a copy of MegaCorp's opportunity scoring machine-learning model E 161, from the cluster of available scoring serving containers A 140-G 152. The routing manager 164 may also apply a multi-dimensional bin-packing algorithm to the model information to select the recommending serving container B 136 that has the largest combination of available cache and available CPU capacity to execute a copy of MegaCorp's opportunity recommending machine-learning model, from the cluster of available recommending serving containers A 134-C 138. The routing manager 164 may further apply a multi-dimensional bin-packing algorithm to the model information to select the ranking serving container C 132 that has the largest combination of available cache and available CPU capacity to execute a copy of MegaCorp's opportunity ranking machine-learning model, from the cluster 116 of available ranking serving containers A 128-C 132.

In an alternative example, the routing container 126 uses the same consistent hashing algorithm to identify the scoring serving containers B 142, E 148, and G 152 as the first, second, and third scoring serving containers to evaluate for loading a copy of MegaCorp's opportunity scoring machine-learning model E 161, from the cluster 120 of available scoring serving containers A 140, B 142, C 144, D 146, E 148. F 150, and G 152, which can load or have loaded a copy of any scoring machine-learning model that shares the same library to generate the scores of business opportunities. The routing container 126 may also use the same consistent hashing algorithm to identify the recommending serving containers A 134, B 136, and C 138 as the first, second, and third recommending serving containers to evaluate for loading a copy of MegaCorp's opportunity recommending machine-learning model, from the cluster 118 of recommending serving containers A 134, B 136, and C 138, which can load or have loaded a copy of any ranking machine-learning model that shares the same library to generate the recommendations of business opportunities. The routing container 126 may further use the same consistent hashing algorithm to identify the ranking serving containers B 130, C 132, and A 128 as the first, second, and third ranking serving containers to evaluate for loading a copy of Mega-Corp's opportunity ranking machine-learning model, from the cluster 116 of ranking serving containers A 128, B 130, and C 132, which can load or have loaded a copy of any ranking machine-learning model that shares the same library to generate the rankings of business opportunities.

Then the routing container 126 can first evaluate the available cache and the available CPU capacity of the scoring serving container E 148 from the scoring serving containers A 140-G 152, which can load or have loaded a copy of MegaCorp's opportunity scoring machine-learning model E 161. The data model's hierarchy level (3) indicates that the scoring serving container E 148 that has sufficient cache to load and the largest level of available CPU capacity to execute a copy of MegaCorp's opportunity scoring machine-learning model A E 161. Therefore, the routing container 126 routes the scoring sub-request to the scoring serving container E 148, and then adjusts the available cache and available CPU capacity in the data model's hierarchy level (3) for the scoring serving container E 148 and the available cache and available CPU capacity of the cluster 120 of the scoring serving container E 148.

The routing container 126 may first evaluate the available cache and available CPU capacity of the recommending serving container B 136 from the recommending serving containers B 136, A 134, and C 138, which can load or have loaded a copy of MegaCorp's opportunity recommending machine-learning model. The data model's hierarchy level (3) indicates that the recommending serving container B 136 has the largest combination of available cache and available CPU capacity to execute a copy of MegaCorp's opportunity recommending machine-learning model, from the cluster 118 of available recommending serving containers A 134-C 138. Therefore, the routing container 126 routes the recommending sub-request to the recommending serving container B 136, and then adjusts the available cache and available CPU capacity in the data model's hierarchy level (3) for the recommending serving container B 136 and the available cache and available CPU capacity of the cluster 118 of the recommending serving container B 136.

The routing container 126 may further use the same round-robin strategy with a different seed to select to first evaluate the available cache and available CPU capacity of the ranking serving container B 130 from the ranking serving containers B 130, C 132, and A 128, which can load or have loaded a copy of MegaCorp's opportunity ranking machine-learning model. The data model's hierarchy level (3) indicates that although the ranking serving container B 130 has sufficient CPU capacity to execute a copy of MegaCorp's opportunity ranking machine-learning model, the aggregate responses per second, which reflect available CPU capacities, of all the ranking machine-learning models loaded in the cache of the ranking serving container B 130 is greater than the maximum allowable load for optimal operations. Therefore, the routing container 126 selects the next hashed value location traversed on the ranking hash ring, and then evaluates whether the serving container C 132 that corresponds to the next hashed value location traversed on the ranking hash ring has loads on its available cache and available CPU capacity above the maximum allowable loads. The data model's hierarchy level (3) indicates that the ranking serving container C 132 has the largest combination of available cache and available CPU capacity to execute a copy of MegaCorp's opportunity ranking machine-learning model, from the cluster of available ranking serving containers A 128-C 132. Therefore, the routing container 126 routes the ranking sub-request to the ranking serving container C 132, and then adjusts the available cache and available CPU capacity in the data model's hierarchy level (3) for the ranking serving container C 132 and the available cache and available CPU capacity of the cluster 116 of the ranking serving container C 132.

The routing container 126 can use a consistent hashing algorithm to route MegaCorp's sub-request for opportunity scoring to the cluster 120, which includes the scoring serving containers A 140-G 152, which can load or have loaded a copy of MegaCorp's opportunity scoring machine-learning model E 161. The routing containers 122 and 124 also can use the same consistent hashing algorithm to route Acme's sub-requests for opportunity scoring to the same cluster 120, which includes the scoring serving containers A 140-G 152, which can load or have loaded a copy of Acme's opportunity scoring machine-learning model A 154. Therefore, even though MegaCorp's sub-request for opportunity scoring and Acme's sub-requests for opportunity scoring can be routed to the same cluster 120 of scoring serving containers, copies of these two tenants' specific opportunity scoring machine-learning models E 161 and A 154, respectively, are hosted by different scoring serving containers.

However, the same serving container may host copies of both tenants' machine-learning models E 161 and A 154. In a multi-tenant system, the data for multiple tenants may be stored in the same physical database object, but the tenant data is arranged so that data of one tenant is kept logically separate from that of other tenants so that one tenant does not have access to another tenant's data, unless such data is expressly shared. No tenant or identifiable data is stored in the shared service discovery system 162. The machine-learning serving infrastructure 108 provides security mechanisms to keep each tenant's data separate unless the data is shared. Each serving container 128-152 is configured to handle requests for any user associated with any organization that is a tenant.

In the previous example, the one scoring serving container D 146 in the cluster 120 hosts a copy of Acme's opportunity scoring machine-learning model A 154, one scoring serving container E 148 in the cluster 120 hosts a copy of MegaCorp's opportunity scoring machine-learning model E 161, and five scoring serving containers A 140-C 144 and F 150-G 152 in the cluster 120 do not host a copy of either Acme's opportunity scoring machine-learning model A 154 or a copy of MegaCorp's opportunity scoring machine-learning model E 161. Consequently, the seven scoring serving containers 140-152 host an aggregated total of two copies of these tenants' specific opportunity scoring machine-learning models. In contrast, each of seven completely redundant scoring serving containers in a typical cluster of seven completely redundant scoring serving containers would host copies of the two opportunity scoring machine-learning models for the tenants, which would result in an aggregated total of fourteen copies of these tenants' specific opportunity scoring machine-learning models. Even when using numerical examples based on a small cluster of only seven scoring serving containers, the cluster 120 filling with two copies of machine-learning models compared against the typical cluster filling with fourteen copies of machine-learning models results in an estimate that each scoring serving container in a typical cluster would fill with machine-learning models approximately 7 times (fourteen copies divided by two copies) faster than the cluster 120 would fill with machine-learning models.

In addition to selecting an extra serving container, a determination is optionally made whether a copy of an extra identified machine-learning model is loaded in the extra selected serving container, box 756. The system can determine whether the extra selected serving container needs to load the extra identified machine-learning model. In embodiments, this can include the routing container 126 determining whether the scoring serving container E 148 has loaded a copy of MegaCorp's opportunity scoring machine-learning model E 161. The routing container 126 may also determine whether the recommending serving container B 136 has loaded a copy of MegaCorp's opportunity recommending machine-learning model. The routing container 126 may further determine whether the ranking serving container C 132 has loaded a copy of MegaCorp's opportunity ranking machine-learning model. If a copy of the extra identified machine-learning model is not loaded in the extra selected serving container, the method 300 continues to block 758 to load a copy of the extra identified machine-learning model in the extra selected serving container. If a copy of the extra identified machine-learning model is loaded in the extra selected serving container, the method 700 proceeds to block 760 to execute a copy of the extra identified machine-learning model in the extra selected serving container.

If a copy of the extra identified machine-learning model is not loaded in the extra selected serving container, a copy of the extra identified machine-learning model is optionally loaded in the extra selected serving container, box 758. The system can load a copy of the extra identified machine-learning model in the extra selected serving container. For example, and without limitation, this can include the scoring serving container E 148 loading a copy of MegaCorp's opportunity scoring machine-learning model E 161. Also, the recommending serving container B 136 may load a copy of MegaCorp's opportunity recommending machine-learning model, and the ranking serving container C 132 may load a copy of MegaCorp's opportunity ranking machine-learning model.

If a copy of the extra identified machine-learning model is loaded in the extra selected serving container, a copy of the extra identified machine-learning model is optionally executed in the extra selected serving container on behalf of an extra request, box 760. The system can execute the extra identified machine-learning model in the extra selected serving container. By way of example and without limitation, this can include a copy of MegaCorp's opportunity scoring machine-learning model E 161 scoring some purchasable business contacts as MegaCorp's business opportunities, after a copy of MegaCorp's opportunity scoring machine-learning model E 161 is verified as loaded in the scoring serving container E 148.

Also, a copy of MegaCorp's opportunity recommending machine-learning model recommends some of the purchasable business contacts as MegaCorp's business opportunities to MegaCorp's sales representatives, after a copy of MegaCorp's opportunity recommending machine-learning model is verified as loaded in the recommending serving container B 136. Additionally, a copy of MegaCorp's opportunity ranking machine-learning model may rank the recommended business opportunities for each MegaCorp sales representative to determine their personal priorities for working on these business opportunities, after a copy of MegaCorp's opportunity ranking machine-learning model is verified as loaded in the ranking serving container C 132.

After executing a copy of an extra identified machine-learning model in an extra selected serving container on behalf of an extra request, the extra request is optionally responded to, based on executing the extra identified machine-learning model on behalf of the extra request, box 762. The system can respond to an extra request by executing a copy of any extra machine-learning model(s) in any extra serving container(s). In embodiments, this can include the machine-learning serving infrastructure 108 responding to Chris' request with each MegaCorp sales representative's priority-ranked list of recommended business opportunities.

The method 700 may be repeated as desired. Although this disclosure describes the blocks 702-762 executing in a particular order, the blocks 702-762 may be executed in a different order. In other implementations, each of the blocks 702-762 may also be executed in combination with other blocks and/or some blocks may be divided into a different set of blocks.

System Overview

Figure 8:
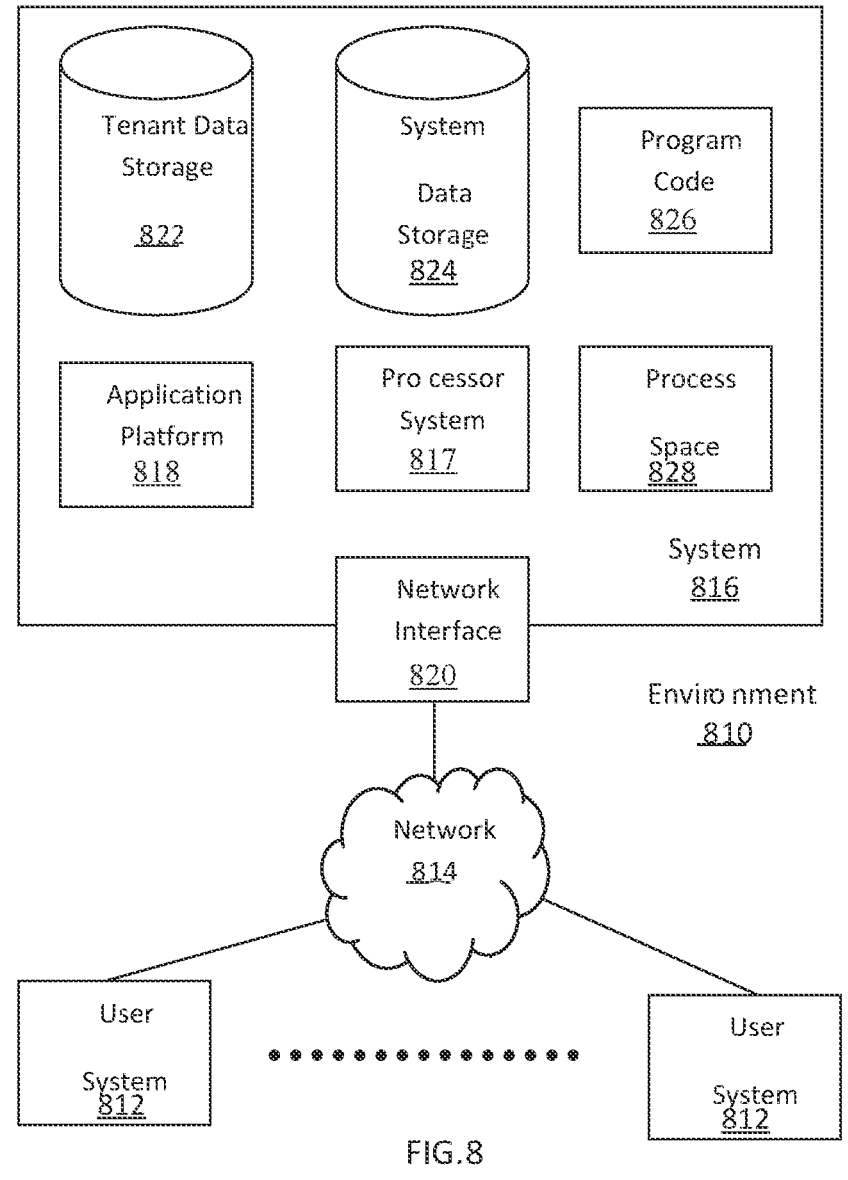
FIG. 8 illustrates a block diagram of an example of an environment wherein an on-demand database service might be used.

FIG. 8 illustrates a block diagram of an environment 810 wherein an on-demand database service might be used. The environment 810 may include user systems 812, a network 814, a system 816, a processor system 817, an application platform 818, a network interface 820, a tenant data storage 822, a system data storage 824, program code 826, and a process space 828. In other embodiments, the environment 810 may not have all the components listed and/or may have other elements instead of, or in addition to, those listed above.

The environment 810 is an environment in which an on-demand database service exists. A user system 812 may be any machine or system that is used by a user to access a database user system. For example, any of the user systems 812 may be a handheld computing device, a mobile phone, a laptop computer, a workstation, and/or a network of computing devices. As illustrated in FIG. 8 (and in more detail in FIG. 9) the user systems 812 might interact via the network 814 with an on-demand database service, which is the system 816.

An on-demand database service, such as the system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 816" and the "system 816" will be used interchangeably herein. A database image may include one or more database objects. A relational database management system (RDMS) or the equivalent may execute storage and retrieval of information against the database object(s). The application platform 818 may be a framework that allows the applications of the system 816 to run, such as the hardware and/or software, e.g., the operating system. In an embodiment, the on-demand database service 816 may include the application platform 818 which enables creation, managing and executing one or more applications developed by the provider of the on-demand database service, users accessing the on-demand database service via user systems 812, or third-party application developers accessing the on-demand database service via the user systems 812.

The users of the user systems 812 may differ in their respective capacities, and the capacity of a particular user system 812 might be entirely determined by permissions (permission levels) for the current user. For example, where a salesperson is using a particular user system 812 to interact with the system 816, that user system 812 has the capacities allotted to that salesperson. However, while an administrator is using that user system 812 to interact with the system 816, that user system 812 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities regarding accessing and modifying application and database information, depending on a user's security or permission level.

The network 814 is any network or combination of networks of devices that communicate with one another. For example, the network 814 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, the networks that the one or more implementations might use are not so limited, although TCP/IP is a frequently implemented protocol.

The user systems 812 might communicate with the system 816 using TCP/IP and, at a higher network level, use other common Internet protocols to communicate, such as HTTP, FTP, AFS, WAP, etc. In an example where HTTP is used, the user systems 812 might include an HTTP client commonly referred to as a "browser" for sending and receiving HTTP messages to and from an HTTP server at the system 816. Such an HTTP server might be implemented as the sole network interface between the system 816 and the network 814, but other techniques might be used as well or instead. In some implementations, the interface between the system 816 and the network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 816, shown in FIG. 8, implements a web-based customer relationship management (CRM) system. For example, in one embodiment, the system 816 includes application servers configured to implement and execute CRM software applications as well as provide related data, code, forms, webpages and other information to and from the user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 816 implements applications other than, or in addition to, a CRM application. For example, the system 816 may provide tenant access to multiple hosted (standard and custom) applications, including a CRM application. User (or third-party developer) applications, which may or may not include CRM, may be supported by the application platform 818, which manages creation, storage of the applications into one or more database objects and executing of the applications in a virtual machine in the process space of the system 816.

One arrangement for elements of the system 816 is shown in FIG. 8, including the network interface 820, the application platform 818, the tenant data storage 822 for tenant data 823, the system data storage 824 for system data 825 accessible to the system 816 and possibly multiple tenants, the program code 826 for implementing various functions of the system 816, and the process space 828 for executing MTS system processes and tenant-specific processes, such as running applications as part of an application hosting service. Additional processes that may execute on the system 816 include database indexing processes.

Several elements in the system shown in FIG. 8 include conventional, well-known elements that are explained only briefly here. For example, each of the user systems 812 could include a desktop personal computer, workstation, laptop, PDA, cell phone, or any wireless access protocol (WAP) enabled device or any other computing device capable of interfacing directly or indirectly to the Internet or other network connection. Each of the user systems 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 812 to access, process and view information, pages, and applications available to it from the system 816 over the network 814. Each of the user systems 812 also typically includes one or more user interface devices, such as a keyboard, a mouse, trackball, touch pad, touch screen, pen, or the like, for interacting with a graphical user interface (GUI) provided by the browser on a display (e.g., a monitor screen, LCD display, etc.) in conjunction with pages, forms, applications, and other information provided by the system 816 or other systems or servers. For example, the user interface device may be used to access data and applications hosted by the system 816, and to perform searches on stored data, and otherwise allow a user to interact with various GUI pages that may be presented to a user. As discussed above, embodiments are suitable for use with the Internet, which refers to a specific global internetwork of networks. However, other networks may be used instead of the Internet, such as an intranet, an extranet, a virtual private network (VPN), a non-TCP/IP based network, any LAN or WAN or the like.

According to one embodiment, each of the user systems 812 and all its components are operator configurable using applications, such as a browser, including computer code run using a central processing unit such as an Intel Pentium® processor or the like. Similarly, the system 816 (and additional instances of an MTS, where more than one is present) and all their components might be operator configurable using application(s) including computer code to run using a central processing unit such as the processor system 817, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 816 is configured to provide webpages, forms, applications, data, and media content to the user (client) systems 812 to support the access by the user systems 812 as tenants of the system 816. As such, the system 816 provides security mechanisms to keep each tenant's data separate unless the data is shared. If more than one MTS is used, they may be near one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9:
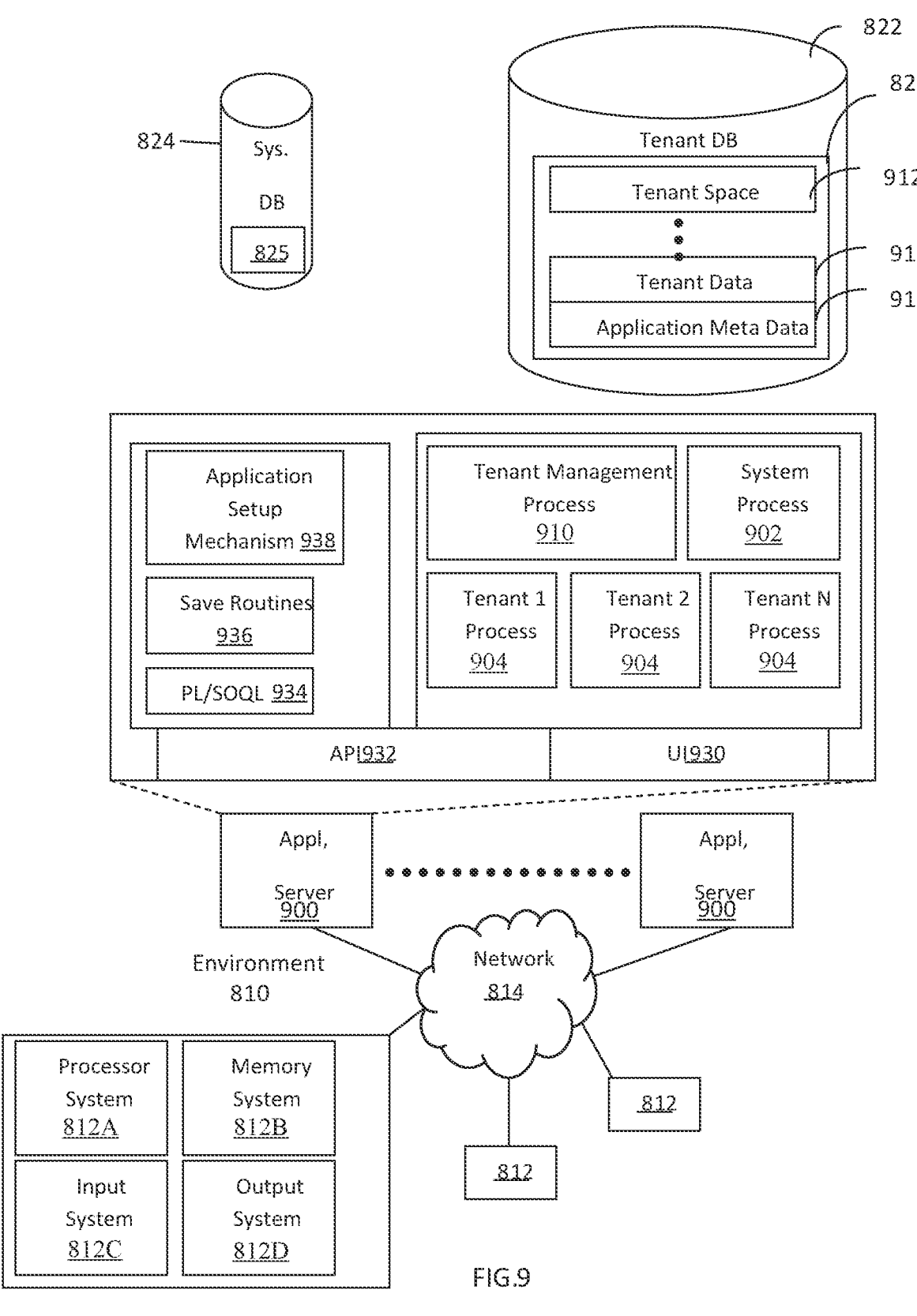
FIG. 9 illustrates a block diagram of an embodiment of elements of FIG. 8 and various possible interconnections between these elements.

FIG. 9 also illustrates the environment 810. However, in FIG. 9 elements of the system 816 and various interconnections in an embodiment are further illustrated. FIG. 9 shows that the each of the user systems 812 may include a processor system 812A, a memory system 812B, an input system 812C, and an output system 812D. FIG. 9 shows the network 814 and the system 816. FIG. 9 also shows that the system 816 may include the tenant data storage 822, the tenant data 823, the system data storage 824, the system data 825, a User Interface (UI) 930, an Application Program Interface (API) 932, a PL/SOQL 934, save routines 936, an application setup mechanism 938, applications servers $900_1$-$900_N$, a system process space 902, tenant process spaces 904, a tenant management process space 910, a tenant storage area 912, a user storage 914, and application metadata 916. In other embodiments, the environment 810 may not have the same elements as those listed above and/or may have other elements instead of, or in addition to, those listed above.

The user systems 812, the network 814, the system 816, the tenant data storage 822, and the system data storage 824 were discussed above in FIG. 8. Regarding the user systems 812, the processor system 812A may be any combination of one or more processors. The memory system 812B may be any combination of one or more memory devices, short-term, and/or long-term memory. The input system 812C may be any combination of input devices, such as one or more keyboards, mice, trackballs, scanners, cameras, and/or interfaces to networks. The output system 812D may be any combination of output devices, such as one or more monitors, printers, and/or interfaces to networks. As shown by FIG. 9, the system 816 may include the network interface 820 (of FIG. 8) implemented as a set of HTTP application servers 900, the application platform 818, the tenant data storage 822, and the system data storage 824. Also shown is the system process space 902, including individual tenant process spaces 904 and the tenant management process space 910. Each application server 900 may be configured to access tenant data storage 822 and the tenant data 823 therein, and the system data storage 824 and the system data 825 therein to serve requests of the user systems 812. The tenant data 823 might be divided into individual tenant storage areas 912, which may be either a physical arrangement and/or a logical arrangement of data. Within each tenant storage area 912, the user storage 914 and the application metadata 916 might be similarly allocated for each user. For example, a copy of a user's most recently used (MRU) items might be stored to the user storage 914. Similarly, a copy of MRU items for an entire organization that is a tenant might be stored to the tenant storage area 912. The UI 930 provides a user interface, and the API 932 provides an application programmer interface to the system 816 resident processes to users and/or developers at the user systems 812. The tenant data and the system data may be stored in various databases, such as one or more Oracle™ databases.

The application platform 818 includes the application setup mechanism 938 that supports application developers' creation and management of applications, which may be saved as metadata into the tenant data storage 822 by the save routines 936 for execution by subscribers as one or more tenant process spaces 904 managed by the tenant management process 910 for example. Invocations to such applications may be coded using the PL/SOQL 934 that provides a programming language style interface extension to the API 932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 916 for the subscriber making the invocation and executing the metadata as an application in a virtual machine.

Each application server 900 may be communicably coupled to database systems, e.g., having access to the system data 825 and the tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user could hit three different application servers 900, and three requests from different users could hit the same application server 900. In this manner, the system 816 is multi-tenant, wherein the system 816 handles storage of, and access to, different objects, data and applications across disparate users and organizations.

As an example of storage, one tenant might be a company that employs a sales force where each salesperson uses the system 816 to manage their sales process. Thus, a user might maintain contact data, leads data, customer follow-up data, performance data, goals, and progress data, etc., all applicable to that user's personal sales process (e.g., in the tenant data storage 822). In an example of a MTS arrangement, since all the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all the users for a given organization that is a tenant. Thus, there might be some data structures managed by the system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 816 might also maintain system level data usable by multiple tenants or other data. Such system level data might include industry reports, news, postings, and the like that are sharable among tenants.

In certain embodiments, the user systems 812 (which may be client systems) communicate with the application servers 900 to request and update system-level and tenant-level data from the system 816 that may require sending one or more queries to the tenant data storage 822 and/or the system data storage 824. The system 816 (e.g., an application server 900 in the system 816) automatically generates one or more SQL statements (e.g., one or more SQL queries) that are designed to access the desired information. The system data storage 824 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. The word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

The invention claimed is:

1. A system for using container and model information to select containers for executing models, the system comprising:

one or more processors; and a non-transitory computer readable medium storing a plurality of instructions, which when executed, cause the one or more processors to:

identify a version of a machine-learning model associated with a request, in response to receiving the request from an application;

identify model information associated with machine-learning models corresponding to a cluster of available serving containers associated with the version of the machine-learning model;

select, based on the model information, an existing serving container from the cluster of available serving containers to respond to the request by executing the version of the machine-learning model based on respective resources available to load the version of the machine-learning model of one or more serving containers that have the version of the machine-learning model loaded and one or more serving containers that do not have the version of the machine-learning model loaded, wherein available serving containers are available to respond to the request;

when the existing serving container that has the version of the machine-learning model loaded is selected, execute, in the existing serving container, the version of the machine-learning model that is loaded in the existing serving container on behalf of the request when not being used by another request, and when the version of the machine-learning model is being used by another request, instead of waiting for the another request to finish, load another copy of the version of the machine-learning model into the existing serving container such that multiple copies of the version of the machine-learning model are stored in the existing serving container, and execute, in the existing serving container, the another copy of the version of the machine-learning model on behalf of the request;

when the existing serving container that does not have the version of the machine-learning model loaded is selected, load a copy of the version of the machine-learning model in the existing serving container; and respond to the request based on executing the machine-learning model on behalf of the request.

2. The system of claim 1, comprising further instructions, which when executed, cause the one or more processors to update a data structure comprising at least one of model information associated with machine-learning models corresponding to any serving containers in any cluster of serving containers and container information associated with serving containers in any corresponding cluster of serving containers.

3. The system of claim 1, comprising further instructions, which when executed, cause the one or more processors to:
  identify another version of another machine-learning model associated with the request;
  identify model information associated with machine-learning models corresponding to another cluster of available serving containers associated with the another version of the another machine-learning model;
  select, based on the model information, another serving container from the another cluster of available serving containers;
  load the another version of the another machine-learning model in the another serving container, in response to a determination that the another version of the another machine-learning model is not loaded in the another serving container; and
  execute, in the another serving container, the another version of the another machine-learning model on behalf of the request, in response to a determination that the another version of the another machine-learning model is loaded in the another serving container;
  wherein responding to the request is further based on executing the another version of the another machine-learning model on behalf of the request.

4. The system of claim 1, comprising further instructions, which when executed, cause the one or more processors to:
  identify the version of the machine-learning model associated with an additional request, in response to receiving the additional request from the application;
  identify model information associated with machine-learning models corresponding to the cluster of available serving containers associated with the version of the machine-learning model;
  select, based on the model information, an additional serving container from the cluster of available serving containers;
  load a copy of the machine-learning model in the additional serving container, in response to a determination that the copy of the machine-learning model is not loaded in the additional serving container;
  execute, in the additional serving container, the copy of the machine-learning model on behalf of the additional request, in response to a determination that the copy of the machine-learning model is loaded in the additional serving container; and
  respond to the additional request based on executing the copy of the machine-learning model on behalf of the additional request.

5. The system of claim 1, comprising further instructions, which when executed, cause the one or more processors to:
  identify an extra version of an extra machine-learning model associated with an extra request, in response to receiving the extra request from an extra application;
  identify model information associated with machine-learning models corresponding to the cluster of available serving containers which is associated with both the extra version of the extra machine-learning model and the version of the machine-learning model;
  select, based on the model information, an extra serving container from the cluster of available serving containers;
  load the extra machine-learning model in the extra serving container, in response to a determination that the extra machine-learning model is not loaded in the extra serving container;
  execute, in the extra serving container, the extra machine-learning model on behalf of the extra request, in response to a determination that the extra machine-learning model is loaded in the extra serving container; and
  respond to the extra request based on executing the extra machine-learning model on behalf of the extra request.

6. The system of claim 5, wherein the application is associated with a first tenant and the extra application is associated with a second tenant.

7. The system of claim 1, wherein select the existing serving container from the cluster of available serving containers is based on one of leveraging a bin-packing algorithm and leveraging a consistent hashing algorithm with identifiers of each serving container associated with the version of the machine-learning model and with an identifier of the version of the machine-learning model.

8. A non-transitory computer program product comprising computer-readable program code to be executed by one or more processors when retrieved from a non-transitory computer-readable medium, the program code including instructions to:
  identify a version of a machine-learning model associated with a request, in response to receiving the request from an application;
  identify model information associated with machine-learning models corresponding to a cluster of available serving containers associated with the version of the machine-learning model;
  select, based on the model information, an existing serving container from the cluster of available serving containers to respond to the request by executing the version of the machine-learning model based on respective resources available to load the version of the machine-learning model of one or more serving containers that have the version of the machine-learning model loaded and one or more serving containers that do not have the version of the machine-learning model loaded, wherein available serving containers are available to respond to the request;
  when the existing serving container that has the version of the machine-learning model loaded is selected, execute, in the existing serving container, the version of the machine-learning model that is loaded in the existing serving container on behalf of the request when not being used by another request, and when the version of the machine-learning model is being used by another request, instead of waiting for the another request to finish, load another copy of the version of the machine-learning model into the existing serving container such that multiple copies of the version of the machine-learning model are stored in the existing serving container, and execute, in the existing serving container, the another copy of the version of the machine-learning model on behalf of the request;
  when the existing serving container that does not have the version of the machine-learning model loaded is selected, load a copy of the version of the machine-learning model in the existing serving container; and
  respond to the request based on executing the machine-learning model on behalf of the request.

9. The non-transitory computer program product of claim 8, wherein the program code comprises further instructions to update a data structure comprising at least one of model information associated with machine-learning models corresponding to any serving containers in any cluster of serving containers and container information associated with serving containers in any corresponding cluster of serving containers.

10. The non-transitory computer program product of claim 8, wherein the program code comprises further instructions to:

identify another version of another machine-learning model associated with the request;

identify model information associated with machine-learning models corresponding to another cluster of available serving containers associated with the another version of the another machine-learning model;

select, based on the model information, another serving container from the another cluster of available serving containers;

load the another version of the another machine-learning model in the another serving container, in response to a determination that the another version of the another machine-learning model is not loaded in the another serving container; and execute, in the another serving container, the another version of the another machine-learning model on behalf of the request, in response to a determination that the another version of the another machine-learning model is loaded in the another serving container;

wherein responding to the request is further based on executing the another version of the another machine-learning model on behalf of the request.

11. The non-transitory computer program product of claim 8, wherein the program code comprises further instructions to:

identify the version of the machine-learning model associated with an additional request, in response to receiving the additional request from the application;

identify model information associated with machine-learning models corresponding to the cluster of available serving containers associated with the version of the machine-learning model;

select, based on the model information, an additional serving container from the cluster of available serving containers;

load a copy of the machine-learning model in the additional serving container, in response to a determination that the copy of the machine-learning model is not loaded in the additional serving container;

execute, in the additional serving container, the copy of the machine-learning model on behalf of the additional request, in response to a determination that the copy of the machine-learning model is loaded in the additional serving container; and respond to the additional request based on executing the copy of the machine-learning model on behalf of the additional request.

12. The non-transitory computer program product of claim 8, wherein the program code comprises further instructions to:

identify an extra version of an extra machine-learning model associated with an extra request, in response to receiving the extra request from an extra application, wherein the application is associated with a first tenant and the extra application is associated with a second tenant;

identify model information associated with machine-learning models corresponding to the cluster of available serving containers which is associated with both the extra version of the extra machine-learning model and the version of the machine-learning model;

select, based on the model information, an extra serving container from the cluster of available serving containers;

load the extra machine-learning model in the extra serving container, in response to a determination that the extra machine-learning model is not loaded in the extra serving container;

execute, in the extra serving container, the extra machine-learning model on behalf of the extra request, in response to a determination that the extra machine-learning model is loaded in the extra serving container; and respond to the extra request based on executing the extra machine-learning model on behalf of the extra request.

13. The non-transitory computer program product of claim 8, wherein select the existing serving container from the cluster of available serving containers is based on one of leveraging a bin-packing algorithm and leveraging a consistent hashing algorithm with identifiers of each serving container associated with the version of the machine-learning model and with an identifier of the version of the machine-learning model.

14. A computer-implemented method for using container and model information to select containers for executing models, the computer-implemented method comprising:

identifying a version of a machine-learning model associated with a first request and a second request, in response to receiving the first request and the second request from an application;

identifying model information associated with machine-learning models corresponding to a cluster of available serving containers associated with the version of the machine-learning model;

selecting, based on the model information, an existing serving container from the cluster of available serving containers to respond to the request by executing the version of the machine- learning model based on respective resources available to load the version of the machine-learning model of one or more serving containers that have the version of the machine-learning model loaded and one or more serving containers that do not have the version of the machine-learning model loaded, wherein available serving containers are available to respond to the request;

selecting, for the first request, the existing serving container that has the version of the machine-learning model loaded, and executing, in the existing serving container, the version of the machine-learning model that is loaded in the existing serving container on behalf of the first request when not being used by another request, and when the version of the machine-learning model is being used by another request, instead of waiting for the another request to finish, loading another copy of the version of the machine-learning model into the existing serving container such that multiple copies of the version of the machine-learning model are stored in the existing serving container, and executing, in the existing serving container, the another copy of the version of the machine-learning model on behalf of the request;

selecting, for the second request, the existing serving container that does not have the version of the machine-learning model loaded, and loading a copy of the version of the machine-learning model in the existing serving container; and responding to the first request or the second request based on executing the machine-learning model on behalf of the first request or the second request.

15. The computer-implemented method of claim 14, the computer-implemented method further comprising updating a data structure comprising at least one of model information associated with machine-learning models corresponding to any serving containers in any cluster of serving containers and container information associated with serving containers in any corresponding cluster of serving containers.

16. The computer-implemented method of claim 14, the computer-implemented method further comprising:

identifying another version of another machine-learning model associated with the request;

identifying model information associated with machine-learning models corresponding to another cluster of available serving containers associated with the another version of the another machine-learning model;

selecting, based on the model information, another serving container from the another cluster of available serving containers;

loading the another version of the another machine-learning model in the another serving container, in response to a determination that the another version of the another machine-learning model is not loaded in the another serving container; and executing, in the another serving container, the another version of the another machine-learning model on behalf of the request, in response to a determination that the another version of the another machine-learning model is loaded in the another serving container; wherein responding to the request is further based on executing the another version of the another machine-learning model on behalf of the request.

17. The computer-implemented method of claim 14, the computer-implemented method further comprising:

identifying the version of the machine-learning model associated with an additional request, in response to receiving the additional request from the application;

identifying model information associated with machine-learning models corresponding to the cluster of available serving containers associated with the version of the machine-learning model;

selecting, based on the model information, an additional serving container from the cluster of available serving containers;

loading a copy of the machine-learning model in the additional serving container, in response to a determination that the copy of the machine-learning model is not loaded in the additional serving container;

executing, in the additional serving container, the copy of the machine-learning model on behalf of the additional request, in response to a determination that the copy of the machine-learning model is loaded in the additional serving container; and responding to the additional request based on executing the copy of the machine-learning model on behalf of the additional request.

18. The computer-implemented method of claim 14, the computer-implemented method further comprising:

identifying an extra version of an extra machine-learning model associated with an extra request, in response to receiving the extra request from an extra application;

identifying model information associated with machine-learning models corresponding to the cluster of available serving containers which is associated with both the extra version of the extra machine-learning model and the version of the machine-learning model;

selecting, based on the model information, an extra serving container from the cluster of available serving containers;

loading the extra machine-learning model in the extra serving container, in response to a determination that the extra machine-learning model is not loaded in the extra serving container;

executing, in the extra serving container, the extra machine-learning model on behalf of the extra request, in response to a determination that the extra machine-learning model is loaded in the extra serving container; and responding to the extra request based on executing the extra machine-learning model on behalf of the extra request.

19. The computer-implemented method of claim 18, wherein the application is associated with a first tenant and the extra application is associated with a second tenant.

20. The computer-implemented method of claim 14, wherein selecting the existing serving container from the cluster of available serving containers is based on one of leveraging a bin-packing algorithm and leveraging a consistent hashing algorithm with identifiers of each serving container associated with the version of the machine-learning model and with an identifier of the version of the machine-learning model.

* * * * *